United States Patent
Li Pi Shan et al.

(10) Patent No.: US 10,870,746 B2
(45) Date of Patent: Dec. 22, 2020

(54) IMPACT MODIFIED COMPOSITIONS FOR LOW TEMPERATURE USE CONTAINERS

(71) Applicant: Dow Global Technologies LLC, Midland, MI (US)

(72) Inventors: Colin Li Pi Shan, Pearland, TX (US); Jihean Lee, Pearland, TX (US); Raymond L. Laakso, Jr., St. Francisville, LA (US); Eddy I. Garcia-Meitin, Angleton, TX (US); Yushan Hu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 63 days.

(21) Appl. No.: 16/332,543

(22) PCT Filed: Sep. 11, 2017

(86) PCT No.: PCT/US2017/050896
§ 371 (c)(1),
(2) Date: Mar. 12, 2019

(87) PCT Pub. No.: WO2018/049300
PCT Pub. Date: Mar. 15, 2018

(65) Prior Publication Data
US 2019/0218383 A1 Jul. 18, 2019

Related U.S. Application Data

(60) Provisional application No. 62/393,472, filed on Sep. 12, 2016.

(51) Int. Cl.
| | | |
|---|---|---|
| C08L 23/16 | (2006.01) | |
| C08L 23/14 | (2006.01) | |
| C08L 23/12 | (2006.01) | |
| C08L 53/00 | (2006.01) | |

(52) U.S. Cl.
CPC ............. *C08L 23/16* (2013.01); *C08L 23/12* (2013.01); *C08L 23/14* (2013.01); *C08L 53/00* (2013.01); *C08L 2205/03* (2013.01); *C08L 2205/035* (2013.01); *C08L 2207/02* (2013.01)

(58) Field of Classification Search
CPC ................................. C08L 23/14; C08L 53/00
See application file for complete search history.

(56) References Cited

U.S. PATENT DOCUMENTS

| | | | |
|---|---|---|---|
| 3,798,288 A | 3/1974 | McManimie | |
| 6,015,854 A | 1/2000 | McCullough, Jr. | |
| 6,395,671 B2 | 5/2002 | LaPointe | |
| 7,608,668 B2 | 10/2009 | Li Pi Shan et al. | |
| 7,858,706 B2 | 12/2010 | Arriola et al. | |
| 7,893,166 B2 | 2/2011 | Shan et al. | |
| 7,947,793 B2 | 5/2011 | Marchand et al. | |
| 7,951,882 B2 | 5/2011 | Arriola et al. | |
| 8,053,529 B2 | 11/2011 | Carnahan et al. | |
| 8,106,139 B2 | 1/2012 | Marchand et al. | |
| 8,124,709 B2 | 2/2012 | Marchand et al. | |
| 8,293,859 B2 | 10/2012 | Marchand et al. | |
| 8,362,184 B2 | 1/2013 | Marchand et al. | |
| 8,372,931 B2 | 2/2013 | Hermel-Davidock et al. | |
| 8,686,087 B2 | 4/2014 | Li Pi Shan et al. | |
| 8,716,400 B2 | 5/2014 | Carnahan et al. | |
| 8,785,554 B2 | 7/2014 | Li Pi Shan et al. | |
| 8,802,774 B2 | 8/2014 | Carnahan et al. | |
| 8,822,598 B2 | 9/2014 | Li Pi Shan et al. | |
| 10,308,796 B2 | 6/2019 | Li Pi Shan et al. | |
| 2006/0199930 A1 | 9/2006 | Li Pi Shan et al. | |
| 2011/0015363 A1 | 1/2011 | Marchand et al. | |
| 2012/0208961 A1 | 8/2012 | Carnahan et al. | |
| 2016/0251505 A1 | 9/2016 | Jin et al. | |
| 2016/0264765 A1 | 9/2016 | Barry et al. | |

FOREIGN PATENT DOCUMENTS

WO  WO 2015057423  *  4/2015

OTHER PUBLICATIONS

D. Hansen, et al., Styrenic block copolymers for making clear tough blends with polypropylene, International Conference on Polyolefins, 2006, pp. 1-8.
N.R. Dharmarajan and T.C. Yu, Modifying polypropylene with a metallocene plastomer, Plastics Engineering, 1996, pp. 1-5.
PCT/US2017/050896, International Search Report and Written Opinion dated Jun. 11, 2017.
PCT/US2017/050896, International Preliminary Report on Patentability dated Mar. 12, 2019.

* cited by examiner

*Primary Examiner* — Jeffrey C Mullis
(74) *Attorney, Agent, or Firm* — Cheney Huang

(57) ABSTRACT

Embodiments relate to compositions comprising: (a) from 60 wt % to 90 wt % of a propylene polymer base that has a melt flow rate from 2 g/10 min to 100 g/10 min according to ASTM D1238 (230° C./2.16 kg); (b) from 2 wt % to 39.5 wt % of an olefin block copolymer; and (c) from 0.5 wt % to 20 wt % of a composite component comprising a crystalline block composite or a block composite. In certain embodiments, the composition may further comprise: (d) from 1 wt % to 30 wt % a polyolefin copolymer, the polyolefin copolymer being derived from ethylene and at least one of a C3 to C10 alpha-olefin, having a melt index from 100 g/10 min to 2000 g/10 min according to ASTM D1238 (190° C./2.16 kg), and having a density from 0.860 g/cc to 0.900 g/cc. In further embodiments, the composition may further comprise: (e) from 0.1 wt % to 5 wt % of an antioxidant.

7 Claims, 6 Drawing Sheets

Comparative Example C

Working Example 3

Working Example 2

Working Example 9

Working Example 6

Working Example 5

IMPACT MODIFIED COMPOSITIONS FOR LOW TEMPERATURE USE CONTAINERS

FIELD

Embodiments relate to impact modified compositions for use in forming high clarity-low temperature use containers such as freezer containers.

BACKGROUND

Polyolefin based materials for forming freezer containers for use at low temperatures (i.e., below 0° C.), that still have high clarity (i.e., greater than 90% clarity), may be challenging. Polypropylene-based homopolymers or polypropylene-based random copolymers (RCP) may provide desirable stiffness and clarity for many applications but suffer from relatively poor impact properties at lower temperatures due to polypropylene's high Tg (glass transition temperature). To overcome this deficiency, the use of polypropylene-based homopolymers, polypropylene-based random copolymers (RCP), or polypropylene-based copolymers that have been impact-modified with elastomers have been proposed. However, such impact-modified copolymers may suffer from relatively poor modulus and clarity in comparison to the homopolymers and random copolymers. Accordingly, there is a need for polyolefin compositions that can provide toughness and stiffness, as well as clarity even at low temperatures.

SUMMARY

Disclosed herein is a composition for forming a sub-ambient temperature use container, the composition comprising:

(a) from 60 wt % to 90 wt % of a propylene polymer base that has a melt flow rate from 2 g/10 min to 100 g/10 min according to ASTM D1238 (230° C./2.16 kg);

(b) from 2 wt % to 39.5 wt % of an olefin block copolymer; and (c) from 0.5 wt % to 20 wt % of a composite component comprising a crystalline block composite or a block composite.

In certain embodiments, the composition may further comprise: (d) from 1 wt % to 30 wt % a polyolefin copolymer, the polyolefin copolymer being derived from ethylene and a $C_3$ to $C_{10}$ alpha-olefin, having a melt index from 100 g/10 min to 2000 g/10 min according to ASTM D1238 (190° C./2.16 kg), and having a density from 0.860 g/cc to 0.900 g/cc. In further embodiments, the composition may further comprise: (e) from 0.1 wt % to 5 wt % of an antioxidant.

BRIEF DESCRIPTION OF THE DRAWINGS

Features of the embodiments will be apparent to those of ordinary skill in the art with reference to the attached figures, in which.

DETAILED DESCRIPTION

Figure 1:
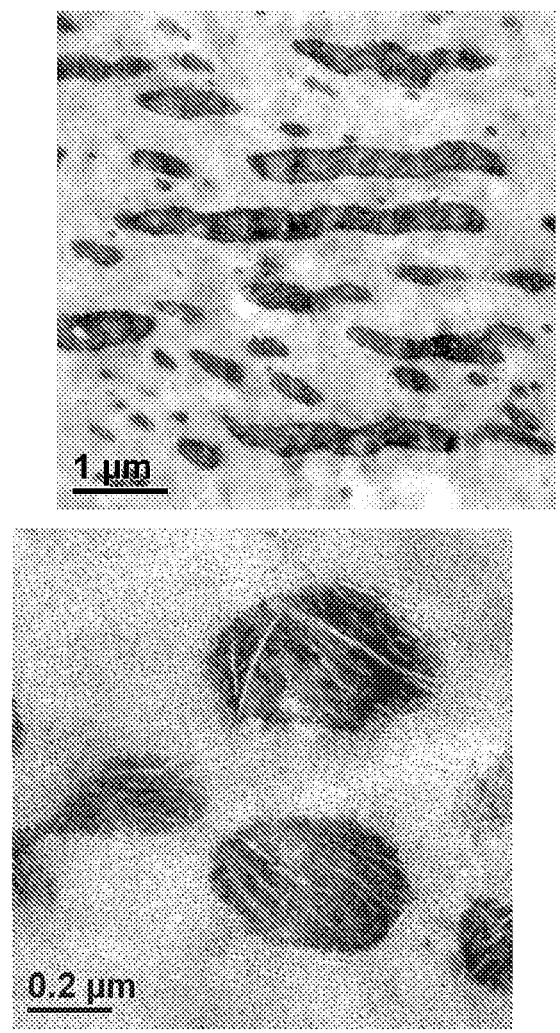
FIG. 1 illustrates the TEM morphology of Comparative Ex. C at 1 μm and 0.2 μm.

The selection of polypropylene (PP) polymers having a combination of high clarity and impact resistance is limited to random copolymers (RCP), impact copolymers (ICP) or those impact modified with elastomers that are either miscible with the polypropylene (PP) or have similar refractive indices. Impact efficiency of an elastomeric modifier is directly related to its crystallinity and dispersion of the individual elastomer domains into a PP matrix. Conventionally, dispersion of an elastomer into polypropylene is challenged by the melt-mixing process and compatibility with the polypropylene. A significant improvement would be to develop an elastomer modifier that can meet the clarity and impact requirements for use in clear freezer containers and other low temperature applications.

Composite components including, e.g., crystalline block composites and block composites, as defined below, offer a compatiblization solution to reduce the domain sizes (e.g., to 100-500 nm) of the elastomer phase when blended in PP. These novel compatibilized blends of PP and elastomers offer a wider range of thermodynamically-stable compositions with morphologies finer than those achievable with classical blends, resulting in unique combinations of properties.

Until now, the addition of elastomer significantly lowered the polypropylene modulus and clarity. To obtain clear elastomer materials, typically, refractive index matching of the materials is necessary instead of fundamentally reducing the rubber domain size to avoid the scattering of the visible wavelengths of light. In the present disclosure, blends of PP homopolymer and crystalline block composites or block composites that have a continuous PP phase surprisingly result in smaller and discrete rubber domains than a simple PP/elastomer blend. In this case, since the rubber domain sizes are smaller than the wavelengths of visible light (400-700 nm), less scattering of the light occurs, and the polymer remains clear. Since the crystalline block composites and block composites contain compatibilized rubber, this new impact-modified PP exhibits improved toughness at low temperatures and have similar light transmittance as PP homopolymer.

A further improvement to the above concept would be to reduce the size of the domains of ethylene-based olefin block copolymers (e.g., INFUSE' olefin block copolymers available from The Dow Chemical Company), including those that are high in alpha-olefin comonomer content, have lower density, and are not refractive index matched. For example, compatibilization and sizing of an olefin block copolymer would result in the highest impact efficiency due to its relatively high comonomer (e.g., octene) content and its soft block amount, thereby resulting in a low glass transition temperature (<−50° C.).

Accordingly, as discussed below, the present disclosure relates to the surprising and unexpected discovery of novel compositions, including a composite component comprising a crystalline block composite or a block composite and an ethylene-based olefin block copolymer (e.g., INFUSE™ olefin block copolymers available from The Dow Chemical Company), that are very efficient impact modifiers for PP. Such novel impact modifier compositions are surprisingly compatible since it contains fractions of high density polyethylene and lower density elastomer, of which neither are refractive index matched to PP. It has been demonstrated that such compositions can be compatibilized with the composite component to result in improved dispersion in PP, remains clear in PP, and provides excellent impact toughness at freezer temperatures.

This new compatibilization approach is effective for improved dispersion and morphology stabilization of the elastomeric phase, leading to highly efficient impact modifiers for polypropylene. Accordingly, these novel compositions with high clarity, high modulus, and a −50° C. Tg would be useful for developing high clarity impact copolymers suitable for freezer applications and rigid durables. Other applications that can benefit from the improved balance of impact, clarity, and modulus include but are not limited to decorative films, packaging film, retort food packaging, injection stretch blow molded bottles, BOPP films, thermoformed trays and cups, clear packaging for toys, window films and glazing, skylights, optical fibers, protective films, security films, graphic arts, signage, optical diffusers, light management, light and colour enhancement films, imitation metallic paint and appearance, low temperature sealants, bundling, stretch hood, clear instrument panels for automotive interiors, automotive head light covers, eye glasses and coatings, photovoltaic films, rigid tubing, rigid clear rods for curtains, greenhouse films, lamp guards, water pitchers, drinking glasses, beer steins, kitchen and/or bathroom faucet handles or covers.

Terms

The numerical ranges in this disclosure are approximate, and thus may include values outside of the range unless otherwise indicated. The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.). As used with respect to a chemical compound, unless specifically indicated otherwise, the singular includes all isomeric forms and vice versa.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

"Composition" and like terms mean a mixture or blend of two or more components. For example, one composition is the combination of a propylene based polymer and a block composite.

"Blend," "polymer blend," and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer, thus, embraces the term homopolymer, usually employed to refer to polymers prepared from only one type of monomer, and the terms interpolymer and copolymer as defined below. The term polymer also embraces all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc. The terms "ethylene/alpha-olefin copolymer" and "propylene/alpha-olefin copolymer" are indicative of interpolymers as described below.

"Units derived from ethylene," "ethylene content," and like terms mean the units of a polymer that formed from the polymerization of ethylene monomers. "Units derived from α-olefin," "alpha-olefin content," "α-olefin content," and like terms mean the units of a polymer that formed from the polymerization of specific α-olefin monomers, in particular at least one of a $C_{3-10}$ α-olefin. "Units derived from propylene," "propylene content," and like terms mean the units of a polymer that formed from the polymerization of propylene monomers.

"Propylene based polymer," and like terms mean a polymer that comprises a majority weight percent polymerized propylene monomer, also referred to as units derived from propylene (based on the total amount of polymerizable monomers), and optionally comprises at least one polymerized comonomer different from propylene (such as at least one selected from a $C_2$ and $C_{4-10}$ α olefin) so as to form a propylene-based interpolymer. For example, when the propylene-based polymer is a copolymer, the propylene content is greater than 50 wt %, based on the total weight of the copolymer.

"Ethylene based polymer" and like terms mean a polymer that comprises a majority weight percent polymerized ethylene monomer, also referred to as units derived from ethylene (based on the total weight of polymerizable monomers), and optionally may comprise at least one polymerized comonomer different from ethylene (such as at least one selected from a $C_{3-10}$ α olefin) so as to form an ethylene-based interpolymer. For example, when the ethylene-based polymer is a copolymer, the amount of ethylene is greater than 50 wt %, based on the total weight to the copolymer.

The term "polyethylene" includes homopolymers of ethylene and copolymers of ethylene and one or more $C_{3-8}$ α-olefins in which ethylene comprises at least 50 mole percent. The term "polypropylene" includes homopolymers of propylene such as isotactic polypropylene, syndiotactic polypropylene, and copolymers of propylene and one or more $C_{2,\ 4-8}$ α-olefins in which propylene comprises at least 50 mole percent. Preferably, a plurality of the polymerized monomer units of at least one block or segment in the polymer (a crystalline block) comprise propylene, preferably at least 90 mole percent, more preferably at least 93 mole percent, and most preferably at least 95 mole percent. A polymer made primarily from a different α-olefin, such as 4-methyl-1-pentene would be named similarly.

"Random copolymer polypropylene" (RCP) and like terms mean a propylene/alpha-olefin interpolymer in which the units derived from the alpha-olefin monomer are randomly distributed across the polymer chain, as opposed to distributed across the polymer chain in an alternating, periodic, or block pattern. In contrast, "homogenous propylene-based interpolymer" and like terms mean a propylene/alpha-olefin interpolymer in which the units derived from the alpha-olefin monomer are approximately evenly distributed across the polymer chains of the bulk polymer.

"Impact modified propylene-based copolymer" and the like terms mean a propylene-based polymer composition that has been impact-modified such that the composition's impact strength at room temperature or below is maintained or increased as compared to said given composition's impact strength at the same temperature without the added impact modifier.

The term "block composite" (BC) refers to polymers comprising an ethylene based polymer (EP) having an ethylene content of from 10 mol % to 90 mol %, an alpha-olefin based polymer (AOP) having an alpha-olefin content of greater than 90 mol %, and a block copolymer having an ethylene block (EB) and an alpha-olefin block (AOB), wherein the ethylene block of the block copolymer is the same composition as the ethylene based polymer of the block composite and the alpha-olefin block of the block copolymer is the same composition as the alpha-olefin based polymer of the block composite. The compositional split between the amount of ethylene based polymer and alpha-olefin based polymer will be essentially the same as that between the corresponding blocks in the block copolymer. In certain embodiments, the alpha-olefin is propylene. In further embodiments, the AOB and EB may be an iPP-EP diblock copolymer.

The term "crystalline block composite" (CBC) refers to polymers comprising a crystalline ethylene based polymer (CEP) having an ethylene content of greater than 90 mol %, a crystalline alpha-olefin based polymer (CAOP) having an alpha-olefin content of greater than 90 mol %, and a block copolymer having a crystalline ethylene block (CEB) and a crystalline alpha-olefin block (CAOB), wherein the CEB of the block copolymer is the same composition as the CEP of the crystalline block composite and the CAOB of the block copolymer is the same composition as the CAOP of the crystalline block composite. The compositional split between the amount of CEP and CAOP will be essentially the same as that between the corresponding blocks in the block copolymer. In exemplary embodiments, the alpha-olefin is propylene. In further embodiments, the CAOB and the CEB may be an iPP-EP (isotactic polypropylene and ethylene-propylene) diblock copolymer.

"Block copolymer" or "segmented copolymer" refers to a polymer comprising two or more chemically distinct regions or segments (referred to as "blocks") joined in a linear manner, that is, a polymer comprising chemically differentiated units that are joined (covalently bonded) end-to-end with respect to polymerized functionality (e.g., polymerized propylenic functionality), rather than in pendent or grafted fashion. Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different type. Multi-block copolymers may be linear multi-block, multi-block star polymers (in which all blocks bond to the same atom or chemical moiety) or comb-like polymers where the B blocks are attached at one end to an A backbone. The block copolymers can be linear or branched. With respect to the block copolymers, the blocks may differ in the amount of comonomer incorporated therein. The blocks may also differ in the type of comonomer, density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of polymer polydispersity (PDI or Mw/Mn), block length distribution, and/or block number distribution, e.g., due to the effect of the shuttling agent(s) in combination with the catalyst(s).

"Crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers may have, but are not limited to, densities of 0.88 g/cc to 0.91 g/cc and melting points of 100° C. to 170° C.

"Amorphous" refers to a polymer lacking a crystalline melting point as determined by differential scanning calorimetry (DSC) or equivalent technique.

"Isotactic" is defined as polymer repeat units having at least 70 percent isotactic pentads as determined by $^{13}$C-NMR analysis. "Highly isotactic" is defined as polymers having at least 90 percent isotactic pentads.

Olefin Block Copolymer

In certain embodiments, the compositions of the present disclosure comprise from 2 wt % to 39.5 wt % of an olefin block copolymer (e.g., from 2 wt % to 30 wt %, from 3 wt % to 20 wt %, from 5 wt % to 20 wt %, from 5 wt % to 18.5 wt %, etc.). The term "olefin block copolymer" or "OBC" means (and is interchangeable with) an "ethylene/α-olefin multi-block interpolymer" or an "ethylene/α-olefin multi-block copolymer" and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. When referring to amounts of "ethylene" or "comonomer" in the interpolymer, it is understood that this means polymerized units thereof. In some embodiments, the ethylene/α-olefin interpolymer is an ethylene/α-olefin multi-block interpolymer. In some embodiments, the ethylene/α-olefin multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows. AAA-AA-BBB-BB.

In certain embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms, or 4 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/ α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In an embodiment, the ethylene multi-block copolymer is defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G' (25° C.), and a storage modulus at 100° C., G' (100° C.), wherein the ratio of G' (25° C.) to G' (100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

It is understood that the ethylene/α-olefin multi-block interpolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The ethylene/α-olefin multi-block interpolymer, and further copolymer, may comprise any one of properties (A) through (G), or may comprises a combination of two or more of (A) through (G).

Another type of ethylene/α-olefin multi-block interpolymers that may be used are those referred to as "mesophase separated". The term "mesophase separation" means a process in which polymeric blocks are locally segregated to form ordered domains. Crystallization of the ethylene segments in these systems is primarily constrained to the resulting mesodomains and such systems may be referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention. In some embodiments, the olefin block copolymer is mesophase separated. Examples of these interpolymers may be found in, for example, International Publication Nos. WO/2009/097560, WO/2009/097565, WO/2009/097525, WO/2009/097529, WO/2009/097532, and WO/2009/097535, all of which are herein incorporated by reference.

With respect to the mesophase separated olefin block copolymers, in some embodiments, the delta comonomer is greater than 18.5 mol %, greater than 20 mol % or greater than 30 mol %. The delta comonomer can be from 18.5 mol % to 70 mol %, from 20 mol % to 60 mol % or from 30 mol % to 50 mol %. The term 'delta comonomer' means the difference in mole percent comonomer between the hard segment and the soft segment of the olefin block copolymer. The delta comonomer can be measured using $^{13}$C NMR such as described below and in U.S. Pat. No. 7,947,793. In certain embodiments, the ethylene/α-olefin multi-block interpolymer has a soft segment composed of from 20 mol % to 50 mol % derived from the comonomer (e.g., octene).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793. Further exemplary catalytic processes include those disclosed in U.S. Pat. No. 8,785,554, which is herein incorporated by reference.

In certain embodiments, the ethylene/α-olefin multi-block interpolymer has a density greater than 0.850 g/cc, further greater than 0.860 g/cc, and further greater than 0.865 g/cc. The density may be, for example, from 0.850 g/cc to 0.950 g/cc, from 0.860 g/cc to 0.925 g/cc, from 0.860 to 0.900 g/cc, and/or from 0.865 g/cc to 0.880 g/cc. Density is measured by the procedure of ASTM D-792 or ISO 1183.

In certain embodiments, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In certain embodiments, the ethylene/α-olefin multi-block interpolymer has a melt index (I2) from 0.1 g/10 min to 50 g/10 min (e.g., from 0.5 g/10 min to 40 g/10 min, from 1 g/10 min to 30 g/10 min, from 3 g/10 min to 20 g/10 min, and/or from 5 g/10 min to 15 g/10 min), as determined using ASTM D-1238 or ISO 1133 (190° C., 2.16 kg load).

Block Composite

In certain embodiments, the composition of the present disclosure includes from 0.5 wt % to 20 wt % (e.g., from 0.5 wt % to 15 wt %, from 0.5 wt % to 10 wt %, from 0.5 wt % to 6 wt %, from 1.5 wt % to 3 wt, etc.) of a composite component comprising a block composite. In exemplary embodiments, the block composite may have a total ethylene content that is from 25 wt % to 70 wt % (e.g., from 25 wt % to 60 wt %, from 25 wt % to 55 wt %, and from 30 wt % to 50 wt %) based on the total weight of the block composite. The remainder of the total weight of the block composite may be accounted for by units derived from at least one $C_{3-10}$ alpha-olefin. For example, the remainder of the total weight of the block composite may be accounted for by units derived from propylene.

In exemplary embodiments, the block composite refers to polymers comprising an ethylene based polymer (EP) (soft copolymer) having an ethylene content of from 10 mol % to 90 mol %, an alpha-olefin based polymer (AOP) (hard copolymer) having an alpha-olefin content of greater than 90 mol %, and a block copolymer having an ethylene block/segment (EB) and an alpha-olefin block/segment (AOB), wherein the ethylene block of the block copolymer is the same composition as the ethylene based polymer of the block composite and the alpha-olefin block of the block copolymer is the same composition as the alpha-olefin based polymer of the block composite. The compositional split between the amount of ethylene based polymer and alpha-olefin based polymer will be essentially the same as that between the corresponding blocks in the block copolymer.

In further embodiments, the block composite refers to polymers comprising an EP having an ethylene content that is greater than 10 wt % and less than 95 wt %, an AOP having a propylene content that is greater than 90 wt % and up to 100 wt %, and a block copolymer (e.g., a diblock) having an EB (i.e., soft block) and an AOB (i.e., hard block), wherein the AOB of the block copolymer is the same composition as the AOP of the block composite and the EB of the block copolymer is the same composition as the EP of the block composite. The compositional split between the amount of EP and AOP will be essentially the same as that between the corresponding blocks in the block copolymer.

In exemplary embodiments, the hard blocks refer to highly crystalline blocks of polymerized alpha-olefin units (e.g., propylene). In the hard blocks, the monomer (i.e., propylene) may be present in an amount greater than 90 wt %. The remainder of the hard block may be the comonomer (e.g., ethylene) in an amount of less than 10 wt %. In exemplary embodiments, the hard blocks comprise all or substantially all propylene units, such as an iPP (isotactic) homopolymer block or an iPP copolymer block with less than 10 wt % of ethylene. In exemplary embodiments, the soft blocks refer to amorphous, substantially amorphous, or elastomeric blocks of polymerized ethylene units. In the soft blocks, the monomer (i.e., ethylene) may be present in an amount of greater than 20 wt % and equal to or less than 100 wt % (e.g., from 40 wt % to 99 wt %, from 45 wt % to 90 wt %, and/or from 50 wt % to 80 wt %). The remainder of the soft block may be the comonomer (e.g., propylene).

According to an exemplary embodiment, the block composite includes a block copolymer having 30-70 wt % hard block and 30-70 wt % soft block. In other words, the block composite includes a block copolymer having 30-70 wt % hard block and 30-70 wt % soft block based on the weight of the block copolymer.

According to an exemplary embodiment, the block copolymer of the block composite has the formula (EP)-(iPP), in which EP represents the soft block of polymerized ethylene and propylene monomeric units (e.g., 50-80 wt % of ethylene and remainder propylene) and iPP represents a hard block of isotactic propylene homopolymer or isotactic propylene copolymer (e.g., less than 10 wt % of ethylene and remainder propylene).

The block composites may include from 0.5 wt % to 95.0 wt % EP, from 0.5 to 95.0 wt % iPP, and from 5.0 wt % to 99.0 wt % of the block copolymer. Weight percents are based on total weight of block composite. The sum of the weight percents of EP, iPP, and the block copolymer equals 100%. An exemplary measurement of the relative amount of the block copolymer is referred to as the Block Composite Index (BCI), as further discussed below. The BCI for the block composite is greater than 0 and less than 1.0.

In some embodiments, the block composites may have a microstructure index greater than 1 and equal to or less than 20. The microstructure index is an estimation using solvent gradient interaction chromatography (SGIC) separation to differentiate between block copolymers from random copolymers. In particular, microstructure index estimation relies on differentiating between two fractions, i.e., a higher random copolymer content fraction and a higher block copolymer content fraction, of which the random copolymer and the block copolymer have essentially the same chemical composition. The early eluting fraction (i.e., the first fraction) correlates to random copolymers and the late eluting component (i.e., the second fraction) correlates to block copolymers. The calculation of the microstructure index is discussed below.

The block composites may have a weight average molecular weight (Mw) from 10,000 g/mol to 2,500.00 g/mol, from 35,000 g/mol to 1,000,000 g/mol, from 50,000 g/mol to 300,000 g/mol, and/or from 50,000 g/mol to 200,000 g/mol. For example, the Mw may be from 20 kg/mol to 1,000 kg/mol, from 50 kg/mol to 500 kg/mol, and/or from 80 kg/mol to 200 kg/mol. The molecular weight distribution (Mw/Mn) or polydispersity of the block composites may be less than 5, between 1 and 5, and/or between 1.5 and 4. Weight average molecular weight (Mw) and number average molecular weight (Mn) are well known in polymer art and can be determined by methods known to a person of ordinary skill in the art.

The melt flow rate (MFR) of the block composites may be from 0.1 g/10 min to 1,000 g/10 min measured in accordance with ASTM D-1238 (230° C.; 2.16 kg). For example, the melt flow rate of the block composites may be from 1 g/10 min to 50 g/10 min, from 1 g/10 min to 25 g/10 min, from 3 g/10 min to 15 g/10 min, and/or from 5 g/10 min to 10 g/10 min.

The density of the block composites may be between 0.850 and 0.900 g/cc. In exemplary embodiments, the density of the block composites is from 0.860 to 0.895, from 0.865 to 0.895, and/or from 0.865 to 0.890 g/cc. Density is measured in accordance with ASTM D792.

The block composites may have a second peak Tm of greater than 90° C. (e.g., greater than 100° C.). According to an exemplary embodiment, the block composites exhibit a second peak Tm in a range from 100° C. to 150° C.).

Crystalline Block Composites

In certain embodiments, the composition of the present disclosure includes from 0.5 wt % to 20 wt % (e.g., from 0.5 wt % to 15 wt %, from 0.5 wt % to 10 wt %, from 0.5 wt % to 6 wt %, from 1.5 wt % to 3 wt, etc.) of a composite component comprising a crystalline block composite. In exemplary embodiments, the crystalline block composite may have a total ethylene content that is from 40 wt % to 70 wt % based on the total weight of the crystalline block composite. The remainder of the total weight of the crystalline block composite may be accounted for by units derived from at least one $C_{3-10}$ alpha-olefin. For example, the remainder of the total weight of the crystalline block composite may be accounted for by units derived from propylene.

The crystalline block composite (CBC) refers to polymers having a crystalline ethylene based polymer (CEP), a crystalline alpha-olefin based polymer (CAOP), and a block copolymer comprising a crystalline ethylene block/segment (CEB) and a crystalline alpha-olefin block/segment (CAOB), wherein the CEB of the block copolymer is the same composition as the CEP of the crystalline block composite and the CAOB of the block copolymer is the same composition as the CAOP of the crystalline block composite. Additionally, the compositional split between the amount of CEP and CAOP will be essentially the same as that between the corresponding blocks in the block copolymer.

The crystalline block composite (CBC) includes the crystalline ethylene based polymer (CEP), the crystalline alpha-olefin based polymer (CAOP), and the block copolymer having the crystalline ethylene block (CEB) and the crystalline alpha-olefin block (CAOB), where the CEB is the same composition as the CEP and the CAOB is the same composition as the CAOP. In the crystalline block composite, the alpha-olefin is at least one selected from the group of $C_{3-10}$ α-olefins (e.g., may be propylene and/or butylene). The CAOP and the CAOB may have an alpha-olefin content that is greater than 90 mol %. The CEP and CEB comprise greater than 90 mol % of units derived from ethylene (i.e., ethylene content), and any remainder may be at least one of selected from the group of $C_{3-10}$ α-olefins as a comonomer (in an amount less than 10 mol %, less than 7 mol %, less than 5 mol %, less than 3 mol %, etc.).

In exemplary embodiments, the CAOP and CAOB include propylene, e.g., greater than 90 mol % units derived from propylene and any remainder may be ethylene and/or at least one of selected from the group of $C_{4-10}$ α-olefins as a comonomer (in an amount less than 10 mol %, less than 7 mol %, less than 5 mol %, less than 4 mol %, less than 4 mol %, etc.). The CEP and CEB include ethylene, e.g., greater than 90 mol % units derived from ethylene and any remainder may be propylene and/or at least one of selected from the group of $C_{4-10}$ α-olefins as a comonomer (in an amount less than 10 mol %, less than 7 mol %, less than 5 mol %, less than 4 mol %, less than 4 mol %, etc.). The compositional split between the amount of CEP and CAOP will be essentially the same as that between the corresponding blocks in the block copolymer. The CEB and the CAOB may be referred to as hard (crystalline) segments/blocks.

In exemplary embodiments, the CAOB refers to highly crystalline blocks of polymerized alpha olefin units in which units derived from the monomer that is one of $C_{3-10}$ α-olefins are present in an amount greater than 90 mol %, greater than 93 mol %, greater than 95 mol %, and/or greater than 96 mol %. In other words, the comonomer content in the CAOB is less than 10 mol %, less than 7 mol %, less than 5 mol %, and/or less than 4 mol %. A CAOB with propylene crystallinity may have corresponding melting points that are 80° C. and above, 100° C. and above, 115° C. and above, and/or 120° C. and above. In some embodiments, the CAOB comprises all or substantially all propylene units. CEB refers to blocks of polymerized ethylene units in which the comonomer content (such as propylene) is 10 mol % or less, between 0 mol % and 10 mol %, between 0 mol % and 7 mol %, and/or between 0 mol % and 5 mol %. Said in another way, the CEB is derived from at least 90 mol % ethylene, greater than 90 mol % ethylene, greater than 93 mol % ethylene, and/or greater than 95 mol % ethylene. Such CEBs have corresponding melting points that may be 75° C. and above, 90° C. and above, and/or 100° C. and above.

In an exemplary embodiment, the CAOB may refer to highly crystalline blocks of polymerized alpha olefin units in which the monomer that is one of $C_{3-10}$ α-olefins is present in an amount of at least 88 wt % and/or at least 90 wt %. In other words, the comonomer content in the CAOBs is less than 10 wt %. CEB may refer to blocks of polymerized ethylene units in which the comonomer content (such as propylene) is 10 wt % or less.

The crystalline block composite may include from 0.5 wt % to 95.0 wt % CEP, from 0.5 wt % to 95.0 wt % CAOP, and from 5.0 wt % to 99.0 wt % of the crystalline block copolymer. For example, the crystalline block composite may include from 5.0 wt % to 80.0 wt % CEP, from 5.0 wt % to 80.0 wt % CAOP, and from 20.0 wt % to 90.0 wt % of the crystalline block copolymer. Weight percents are based on total weight of crystalline block composite. The sum of the weight percents of CEP, CAOP, and the crystalline block copolymer equals 100%. An exemplary measurement of the relative amount of the crystalline block copolymer is referred to as the Crystalline Block Composite Index (CBCI). The CBCI for the crystalline block composite is greater than 0 and less than 1.0. For example, the CBCI is from 0.20 to 0.99, from 0.30 to 0.99, from 0.40 to 0.99, from 0.40 to 0.90, from 0.40 to 0.85, and/or from 0.50 to 0.80.

The crystalline block composite may have, a Tm greater than 90° C. (e.g., for both a first peak and a second peak), a Tm greater than 100° C. (e.g., for both a first peak and a second peak), and/or greater than 120° C. (e.g., for at least one of a first peak and a second peak). For example, the Tm is in the range of from 100° C. to 250° C., from 110° C. to 220° C., and/or from 115° C. to 220° C. According to an exemplary embodiment, the crystalline block composite exhibits a second peak Tm in a range from 100° C. to 130° C. (e.g., 100° C. to 120° C., 100° C. to 110° C., etc.) and a first peak Tm in a range from 110° C. to 150° C. (e.g., 110° C. to 140° C., 115° C. to 130° C., 115° C. to 125° C., etc.), in which the second peak Tm is less than the first peak Tm.

The crystalline block composite may have a weight average molecular weight (Mw) from 10,000 g/mol to 2,500,000 g/mol, from 35000 g/mol to 1,000,000 g/mol, from 50,000 g/mol to 300,000 g/mol, and/or from 50,000 g/mol to 200,000 g/mol. For example, the Mw may be from 20 kg/mol to 1000 kg/mol, from 50 kg/mol to 500 kg/mol, and/or from 80 kg/mol to 125 kg/mol. The molecular weight distribution (Mw/Mn) or polydispersity of the crystalline block composites may be less than 5, between 1 and 5, and/or between 1.5 and 4. Weight average molecular weight (Mw) and number average molecular weight (Mn) are well known in polymer art and can be determined by methods known to a person of ordinary skill in the art.

The MFR (melt flow rate) of the crystalline block composites may be from 0.1 to 1000 dg/min (230° C./2.16 kg), from 1 to 500 g/10 min (230° C./2.16 kg), from 3 to 30 g/10 min (230° C./2.16 kg), and/or from 5 to 11 g/10 min (230° C./2.16 kg).

In accordance with ASTM D792, the density of the crystalline block composite may be between 0.850 and 0.920 g/cc (e.g., from 0.860 g/cc to 0.915 g/cc, from 0.875 g/cc to 0.910 g/cc, and/or from 0.890 g/cc to 0.910 g/cc).

Polymerization of BC and CBC

The block composite and crystalline block composite ("the composites") may be differentiated from conventional, random copolymers, physical blends of polymers, and block copolymers prepared via sequential monomer addition. The composites may be differentiated from random copolymers by characteristics such as higher melting temperatures for a comparable amount of comonomer, BCI, CBCI, and microstructure index; from a physical blend by characteristics such as BCI, CBCI, microstructure index, better tensile strength, improved fracture strength, finer morphology, improved optics, and/or greater impact strength at lower temperature; and from block copolymers prepared by sequential monomer addition by molecular weight distribution, rheology, shear thinning, rheology ratio, and in that there is block polydispersity. For example, the composites include block copolymers having distinct regions or segments (referred to as "blocks") joined in a linear manner. The blocks differ, e.g., in the type of crystallinity such as polyethylene (PE) versus polypropylene (PP). The block copolymers can be linear or branched. When produced in a continuous process, the composites may possess PDI from 1.7 to 15 (e.g., from 1.8 to 10, from 1.8 to 5, and/or from 1.8 to 3.5). When produced in a batch or semi-batch process, the composites may possess PDI from 1.0 to 2.9 (e.g., from 1.3 to 2.5, from 1.4 to 2.0, and/or from 1.4 to 1.8). Exemplary composites are described in, e.g., U.S. Pat. Nos. 8,716,400, 8,802,774, and 8,822,598, which are incorporated herein by reference with respect to, for example, processes to make them and methods of analyzing them.

The composites include the block copolymers possessing a most probable distribution of block lengths. The block copolymers may contain 2 or 3 blocks or segments. In a process for making the polymers of the composites, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The composites are prepared, e.g., by a process comprising contacting an addition polymerizable monomer or mixture of monomers under addition polymerization conditions with a composition comprising at least one addition polymerization catalyst, a cocatalyst, and a chain shuttling agent. The process is characterized by formation of at least some of the growing polymer chains under differentiated process conditions in two or more reactors operating under steady state polymerization conditions or in two or more zones of a reactor operating under plug flow polymerization conditions.

Suitable processes useful in producing the composites may be found in, e.g. example, U.S. Pat. Nos. 8,053,529, 8,686,087, and 8,716,400. The polymerization may be carried out as a continuous polymerization, e.g., a continuous-solution polymerization, in which catalyst components, monomers, and optionally solvent, adjuvants, scavengers, and/or polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Further, a chain shuttling agent(s) may be added at any point during the polymerization including in a first reactor or zone, at the exit or slightly before the exit of the first reactor, between the first reactor or zone and a second or any subsequent reactor or zone, or even solely to the second or any subsequent reactor or zone. Exemplary chain shuttling agents, catalysts, and cocatalysts are those disclosed in, e.g., U.S. Pat. No. 7,951,882. For example, chain shuttling agents that are dialkyl zinc compounds may be used.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

Due to the difference in monomers, temperatures, pressures, or other differences in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes. Each reactor in the series can be operated under high pressure, solution, slurry, or gas phase polymerization conditions.

In the following exemplary processes, continuous or substantially continuous polymerization conditions may be employed. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. A high pressure process may be carried out at temperatures from 100° C. to 400° C. and at pressures above 500 bar (50 MPa). A slurry process may use an inert hydrocarbon diluent and temperatures of from 0° C. up to a temperature just below the temperature at which the resulting polymer becomes substantially soluble in the inert polymerization medium. Exemplary temperatures in a slurry polymerization are from 30° C. and pressures may range from atmospheric (100 kPa) to 500 psi (3.4 MPa).

Without limiting in any way the scope of the embodiments, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Exemplary solvents include $C_{4-10}$ hydrocarbons or mixtures thereof, especially alkanes such as hexane or mixtures of alkanes, as well as one or more of the monomers employed in the polymerization. Catalyst along with cocatalyst and optionally chain shuttling agent are continuously or intermittently introduced in the reactor liquid phase or any recycled portion thereof at a minimum of one location.

The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. For example, use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent. The resulting polymer product is recovered by flashing off volatile components of the reaction mixture such as residual monomers or diluent at reduced pressure, and, if necessary, conducting further devolatilization in equipment such as a devolatilizing extruder.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

Polyolefin Copolymer

In certain embodiments, the compositions of the present disclosure may include from 1 wt % to 30 wt % (e.g., from 1 wt % to 20 wt %, from 5 wt % to 15 wt %, etc.) of a polyolefin copolymer, where the polyolefin copolymer is a high melt flow copolymer derived from ethylene and at least one of a $C_3$ to $C_{10}$ alpha-olefin or is derived from propylene and at least one of a $C_2$ or $C_4$ to $C_{10}$ alpha-olefin. For example, the polyolefin copolymer may be an ethylene-propylene copolymer, an ethylene-butylene copolymer, an ethylene-hexene copolymer, and/or an ethylene-octene copolymer. The polyolefin copolymer has a relatively high melt index such that the melt index is from 100 g/10 min to 2000 g/10 min, according to ASTM D1238 and at 190° C./2.16 kg. For example, the melt index may be from 100 g/10 min to 1500 g/10 min, 200 g/10 min to 1200 g/10 min, 300 g/10 min to 700 g/10 min, and/or 400 g/10 min to 600 g/10 min. The polyolefin copolymer has a relatively low density, according to ASTM D792, such that the density is from 0.860 g/cc to 0.900 g/c, preferably from 0.860 g/cc to 0.885 g/cc, and more preferably from 0.860 g/cc to 0.875 g/cc.

The polyolefin copolymer may have a low glass transition temperature, e.g., less than −30° C., less than −40° C., and/or less than −50° C. The glass transition temperature ($T_g$) may be greater than −80° C. The Brookfield viscosity (@ 350° F./177° C.) may be from 1,000 cP to 25,000 cP (e.g., from 3000 cP to 20,000 cP, from 5000 cP to 20,000 cP, from 10,000 cP to 20,000 cP, and/or from 15,000 cP to 20,000 cP).

The polyolefin copolymer may have a low weight average molecular weight (Mw), e.g., less than or equal to 40,000 g/mole, less than or equal to 30,000 g/mole, and/or less than or equal to 25,000 g/mole. The weight average molecular weight (Mw) may be greater than or equal to 5000 g/mole, greater than or equal to 7000 g/mole, and/or greater than or equal to 10,000 g/mole.

The polyolefin copolymer may have an Mw/Mn of less than 5, preferably less than 4, preferably less than 3.

Propylene Polymer Base

In certain embodiments, the compositions of the present disclosure include from 60 wt % to 90 wt % (e.g., from 70 wt % to 90 wt %, from 75 wt % to 90 wt %, and/or from 80 wt % to 90 wt %) of the propylene polymer base that has a melt flow rate from 2 g/10 min to 100 g/10 min (e.g., from 10 g/10 min to 80 g/10 min, from 20 g/10 min to 60 g/10 min, from 30 g/10 min to 50 g/10 min, and/or from 35 g/10 min to 45 g/10 min), according to ASTM D 1238 and at 230° C./2.16 kg. The propylene polymer base may include one or more polypropylene based polymers that have a melt flow rate from 2 g/10 min to 100 g/10 min, according to ASTM D 1238 and at 230° C./2.16 kg. In exemplary embodiments, the composition may consist essentially of the modifier and the propylene polymer base. The propylene polymer base may include a random copolymer polypropylene that has an ethylene content from 0.5 wt % to 5.0 wt %, based on the total weight of the random copolymer polypropylene. The propylene polymer base may include 95 wt % to 100 wt % of the random copolymer polypropylene based on the total weight of the propylene polymer base.

The propylene polymer base may have a density, in accordance with ASTM D792-00, Method 13, from 0.870 g/cm³ to 0.910 g/cm³ (e.g., from 0.880 g/cm³ to 0.905 g/cm³, from 0.885 g/cm³ to 0.905 g/cm³, and/or from 0.890 g/cm³ to 0.905 g/cm³). The propylene polymer base may consist of heterogeneous polypropylene or homogeneous polypropylene.

The propylene polymer base may be a propylene homopolymer, propylene based interpolymers, a random copolymer polypropylene (RCPP), an impact copolymer polypropylene (e.g., homopolymer propylene modified with at least one elastomeric impact modifier) (ICPP), a high impact polypropylene (HIPP), a high melt strength polypropylene (HMS-PP), an isotactic polypropylene (iPP), a syndiotactic polypropylene (sPP), or a combination thereof. In exemplary embodiments, the propylene polymer base may be in the isotactic form of homopolymer polypropylene, although other forms of polypropylene may be used (e.g., syndiotactic or atactic).

The propylene polymer base is formed without the use of a chain shuttling agent, as discussed above with respect to the composites. Exemplary comonomers for polymerizing with propylene include ethylene, 1-butene, 1 pentene, 1-hexene, 1-heptene, 1-octene, 1-nonene, 1-decene, 1-unidecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene. Exemplary propylene based interpolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Optionally, the propylene polymer base includes a monomer having at least two double bonds such as dienes or trienes.

An exemplary discussion of various polypropylene polymers is contained in Modern Plastics Encyclopedia/89, mid October 1988 Issue, Volume 65, Number 11, pp. 86-92, the entire disclosure of which is incorporated herein by reference. Examples of such propylene based polymers include VERSIFY™ (available from The Dow Chemical Company), Vistamaxx™ (available from Exxon Mobil), INSPIRE™ (available from Braskem), and Pro-Fax (available from LyondellBasell).

In exemplary embodiments, the propylene polymer base may be a propylene-alpha-olefin copolymer, which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93.

The propylene polymer base may contain LCB. For example, the propylene polymer base may contain an average of at least 0.001, an average of at least 0.005 and/or an average of at least 0.01, long chain branches/1000 total carbons. The term long chain branch, as used herein, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length.

The propylene polymer base may include clarifying and/or nucleating agents therewithin. For example, clarifying and/or nucleating agents may alter the way polypropylene chains crystallize and agglomerate in a molten state. These agents may increase the onset of crystallization temperature. Clarifying agents (or clarifiers) are usually organic, non-polymeric molecules. The clarifying generally also may act as nucleating agents, but nucleating agents are not necessarily clarifying agents. Exemplary clarifiers are chemical derivatives of dibenzylidene sorbitol and have melting temperatures within the processing window of polypropylene resins. Nucleating agents generally are inorganic materials with a small average particle size and a high melting point. When a nucleated resin is melted in an extruder, the nucleating agent may typically remain solid and provide a site around which polypropylene spherulites can form. Exemplary nucleating agents are chemical derivatives of benzoic acid. For example, the nucleating agent may be sodium benzoate, kaolin, and/or talc.

The composition may be used in the manufacture of durable containers for applications requiring low temperature (such as sub-ambient and/or below 0° C.) mechanical. The containers may be suitable for use in food and beverage consumer markets. Exemplary container based applications that may benefit from the improved balance of impact, clarity, and modulus include food packaging (such as ice cream containers and puncture resistance bags) for low temperature mechanical properties, beverage bottles, and clear heavy duty shipping sacks.

In various embodiments, the present disclosure relates to a method of manufacturing a sub-ambient temperature use container, the method comprising blending the following: (a) from 60 wt % to 90 wt % of a propylene polymer base that has a melt flow rate from 2 g/10 min to 100 g/10 min according to ASTM D1238 (230° C./2.16 kg); (b) from 2 wt % to 39.5 wt % of an olefin block copolymer; and (c) from 0.5 wt % to 20 wt % of a composite component comprising a crystalline block composite or a block composite.

Composition

The polymer blends may be used to prepare containers with known polymer processes such as extrusion (e.g., sheet extrusion and profile extrusion); molding (e.g., injection molding, rotational molding, and blow molding); and blown film and cast film processes. For example, in general, extrusion is a process by which a polymer is propelled continuously along a screw through regions of high temperature and pressure where it is melted and compacted, and finally forced through a die. The extruder may be a single screw extruder, a multiple screw extruder, a disk extruder or a ram extruder. The die may be a film die, blown film die, sheet die, pipe die, tubing die or profile extrusion die. Injection molding is used for manufacturing a variety of plastic parts for various applications. Typically, injection molding is a process by which a polymer is melted and injected at high pressure into a mold, which is the inverse of the desired shape, to form parts of the desired shape and size. The mold can be made from metal, such as steel and aluminum. Molding is generally a process by which a polymer is melted and led into a mold, which is the inverse of the desired shape, to form parts of the desired shape and size. Molding may be pressureless or pressure-assisted. In exemplary embodiments, the containers are prepared using injection molding.

The temperature of forming the polymer blend may be above the melting temperature of the propylene polymer base. For example, the temperature may be from 150° C. to 250° C. and/or from 200° C. to 225° C., in order to form a homogeneous melt blend. The polymer blend may have a relatively low viscosity blend (compared to traditional modifiers in polypropylene), may operate at a lower temperature, may operate at a lower cycle time, may provide improved uniformity in a resultant part, and/or may provide better homogenous blend with improved balance of clarity and impact properties.

The compositions of the present disclosure can optionally include one or more additives and/or fillers. Non-limiting examples of additives and/or fillers include plasticizers, thermal stabilizers, light stabilizers (e.g., UV light stabilizers and absorbers), antioxidants, slip agents, process aids, optical brighteners, antistats, lubricants, catalysts, rheology modifiers, biocides, corrosion inhibitors, dehydrators, organic solvents, colorants (e.g., pigments and dyes), surfactants, demolding additives, mineral oil, antiblocking agents, nucleating agents, flame retardants, reinforcing fillers (e.g., glass, fibers, anti-scratch additives, talc, calcium carbonate, mica, glass fibers, whisker, etc.), processing aids, metal fibers, boron fibers, ceramic fibers, polymeric fibers, kaolin, glass, ceramic, carbon/polymeric microspheres, silica, mica, carbon fibers, clay, hemp fibers, and combinations thereof.

In various embodiments, the present disclosure provides an article or film made from the composition of the present disclosure via methods known to those of ordinary skill in the art. In certain embodiments, the present disclosure provides an injection molded article made from the composition of the present disclosure via methods known to those of ordinary skill in the art.

According to embodiments, the present disclosure relates to a composition for forming high clarity-low temperature use containers. High clarity-low temperature use container means a container that is formed using an article made from a composition of the present disclosure that is relatively clear with a clarity of at least 95% (e.g., at a thickness of less than 5.0 mm) and has good impact strength at low temperatures. The article for forming the container may have a thickness of less than 5.0 mm, less than 4.0 mm, less than 3.0 mm, and/or less than or equal to 1.6 mm. For example, the thickness may be from 0.1 mm to 0.45 mm, 0.2 mm to 4.0 mm, 0.5 mm to 3.0 mm, and/or 0.5 mm to 2.0 mm. The article for forming the container may also have any or all of the following properties.

In various embodiments, an article made from the composition of the present disclosure has a tensile secant modulus at 2% from 1500 psi to 1850 psi at a thickness of less than 3.0 mm (e.g., less than 2.0 mm and/or less than or equal to 1.6 mm) in accordance with ASTM D1708. In various embodiments, an article made from the composition of the present disclosure has a tensile secant modulus at 10% from 3100 psi to 3850 psi at a thickness of less than 3.0 mm (e.g., less than 2.0 mm and/or less than or equal to 1.6 mm) in accordance with ASTM D1708.

In various embodiments, an article made from the composition of the present disclosure has a tensile stress at break from 2500 psi to 3500 psi at a thickness of less than 3.0 mm (e.g., less than 2.0 mm and/or less than or equal to 1.6 mm) in accordance with ASTM D1708. In various embodiments, an article made from the composition of the present disclosure has an average strain at break from 350% to 500% at a thickness of less than 3.0 mm (e.g., less than 2.0 mm and/or less than or equal to 1.6 mm) in accordance with ASTM D1708.

In various embodiments, an article made from the composition of the present disclosure has a clarity of greater than or equal to 90%, greater than or equal to 93%, greater than or equal to 95%, greater than or equal to 97%, and/or greater than or equal to 99% at a thickness of less than 3.0 mm (e.g., less than 2.0 mm, less than or equal to 1.6 mm, and/or less than or equal to 0.75 mm) in accordance with ASTM D1746.

In various embodiments, an article made from the composition of the present disclosure has a haze of less than or equal to 40%, less than or equal to 35%, less than or equal to 30%, less than or equal to 25%, less than or equal to 20%, and/or less than or equal to 15% at a thickness of less than 3.0 mm (e.g., less than 2.0 mm, less than or equal to 1.6 mm, and/or less than or equal to 0.75 mm) in accordance with ASTM D1746.

In various embodiments, an article made from the composition of the present disclosure has a transmittance of greater than or equal to 65% (e.g., greater than or equal to 70%, greater than or equal to 75%, greater than or equal to 80%, greater than or equal to 85%, greater than or equal to 88%, and/or greater than or equal to 89%) at a thickness of less than 3.0 mm (e.g., less than 2.0 mm, less than or equal to 1.6 mm, and/or less than or equal to 0.75 mm) in accordance with ASTM D1746.

In various embodiments, an article made from the composition of the present disclosure has an average Charpy impact at 23° C. of greater than or equal to 5 $kJ/m^2$ (e.g., greater than or equal to 10 $kJ/m^2$, greater than or equal to 15 $kJ/m^2$, greater than or equal to 20 $kJ/m^2$, greater than or equal to 30 $kJ/m^2$, greater than or equal to 40 $kJ/m^2$, greater than or equal to 50 $kJ/m^2$, greater than or equal to 60 $kJ/m^2$, and/or greater than or equal to 66 $kJ/m^2$) at a thickness of less than 3.0 mm (e.g., less than 2.0 mm and/or less than or equal to 1.6 mm) in accordance with ISO 179.

In various embodiments, an article made from the composition of the present disclosure has an average Izod impact at 23° C. of greater than or equal to 5 $kJ/m^2$ (e.g., greater than or equal to 10 $kJ/m^2$, greater than or equal to 15 $kJ/m^2$, greater than or equal to 20 $kJ/m^2$, and/or greater than or equal to 25 $kJ/m^2$) at a thickness of less than 3.0 mm (e.g., less than 2.0 mm and/or less than or equal to 1.6 mm) in accordance with ASTM D256.

In various embodiments, an article formed from the composition of the present disclosure has an average Izod impact at 0° C. of greater than or equal to 5 $kJ/m^2$ (e.g., greater than or equal to 10 $kJ/m^2$, greater than or equal to 15 $kJ/m^2$, greater than or equal to 20 $kJ/m^2$, and/or greater than or equal to 25 $kJ/m^2$) at a thickness of less than 3.0 mm (e.g., less than 2.0 mm and/or less than or equal to 1.6 mm) in accordance with ASTM D256.

In various embodiments, an article formed from the composition of the present disclosure has an average Izod impact at −20° C. of greater than or equal to 3 $kJ/m^2$ (e.g., greater than or equal to 5 $kJ/m^2$, greater than or equal to 10 $kJ/m^2$, greater than or equal to 15 $kJ/m^2$, and/or greater than or equal to 17 $kJ/m^2$) at a thickness of less than 3.0 mm (e.g., less than 2.0 mm and/or less than or equal to 1.6 mm) in accordance with ASTM D256.

In various embodiments, an article made from the composition of the present disclosure has a Charpy impact ductile failure at 23° C. of less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, and/or less than or equal to 10% at a thickness of less than 3.0 mm (e.g., less than 2.0 mm and/or less than or equal to 1.6 mm) in accordance with ISO 179.

In various embodiments, an article made from the composition of the present disclosure has an Izod impact ductile failure at 23° C. of less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, and/or less than or equal to 10% at a thickness of less than 3.0 mm (e.g., less than 2.0 mm and/or less than or equal to 1.6 mm) in accordance with ASTM D256.

In various embodiments, an article made from the composition of the present disclosure has an Izod impact ductile failure at 0° C. of less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, and/or less than or equal to 10% at a thickness of less than 3.0 mm (e.g., less than 2.0 mm and/or less than or equal to 1.6 mm) in accordance with ASTM D256.

In various embodiments, an article made from the composition of the present disclosure has an Izod impact ductile failure at −20° C. of less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, and/or less than or equal to 10% at a thickness of less than 3.0 mm (e.g., less than 2.0 mm and/or less than or equal to 1.6 mm) in accordance with ASTM D256.

Examples

Test Methods

Density is measured in accordance with ASTM D792. The result is reported in gamma (g) per cubic centimeter, or g/cm³.

Melt Index ($I_2$) is measured in accordance with ASTM D-1238 (190° C.; 2.16 kg). The result is reported in grams/10 minutes.

Melt flow rate (MFR) is measured in accordance with ASTM D-1238 (230° C.; 2.16 kg). The result is reported in grams/10 minutes.

Tensile Properties, including Tensile Secant Modulus (2%), Tensile Secant Modulus (10%), Tensile Stress at Break, and Average Strain at Break, are measured according to ASTM D1708.

Secant Flexural Modulus, including Flex 1% and Flex 2%, is measured according ASTM D790.

Percent Clarity, Percent Haze, and Percent Transmittance are measured using BYK Gardner Haze-gard as specified in ASTM D1746.

Izod Impact, including at 23° C., at 0° C., and −20° C., are measured according to ASTM D256, at a thickness as indicated in the respective examples. Samples are preparing by injection molding.

Charpy Impact is based on ISO 179 for Determination of Charpy Impact Properties. It calculates the impact energy absorbed by a specimen after windage and friction loss has automatically been determined. Ten specimens are die cut from a molded plaque. Specimens are approximately 80 mm in length and 10 mm in width.

Differential Scanning calorimetry (DSC) is performed on a TA Instruments Q100 DSC V9.8 Build 296 using Universal V3.7A analysis software from TA Instruments. Samples are rapidly heated to 230° C. and held isothermally for 3 minutes in order to remove any previous heat history. The sample are then cooled to −90° C. at 10° C./minute cooling rate and held at −90° C. for 3 minutes. The first cooling and second heating curves are recorded. The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc). With respect to DSC, the temperature at the maximum heat flow rate with respect to a linear baseline is used as the melting point. The linear baseline is constructed from the beginning of the melting (above the glass transition temperature) and to the end of the melting peak.

High Temperature Liquid Chromatography: High Temperature Liquid Chromatography Experimental Method Instrumentation is the HTLC experiment, which is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-P020-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Brun, Y.; Foster, P. *J. Sep. Sci.* 2010, 33, 3501). A dual-angle light scattering detector (PD2040, Agilent, Santa Clara, Calif., USA) and an IRS inferred absorbance detector are connected after the SEC column for measurement of concentration, composition, and molecular weight.

Separation for HTLC: Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IRS detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-µL aliquot of sample solution is injected into the HTLC column. The injection triggers the gradient described below:

From 0-10 min, 100% decane/0% TCB;

From 10-651 min, TCB is increased linearly from 0% TCB to 80% TCB.

The injection also triggers the collection of the light scattering signal at 15° angle (LS15) and the "measure" and "methyl" signals from IRS detector (IRmeasure and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min. Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC: The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$X_n$=elution volume (mL)=D1 flow rate×n×$t_{switch}$ where $t_{switch}$=3 min is the switch time of the 10-port VICI valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume. The normalized $IR_{measure}$ HTLC chromatogram is shown in FIG. 9 with Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of LS15/$IR_{measure}$ is used to calculate weight-average molecular weight ($M_w$) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min Therefore, the peak of the polymer appears at the HTLC column void volume. A calibration constant, $\Omega$, is determined from the total LS15 signals ($A_{LS15}$) and the total $IR_{measure}$ signals ($A_{IR,measure}$):

$$\Omega = \frac{A_{LS15}}{A_{IR,measure}M_w}$$

The experimental LS15/$IR_{measure}$ ratio is then converted to $M_w$ through $\Omega$.

By way of example, three HTLC chromatograms are shown in FIG. 11. The black chromatogram is for Comparative BCN1 (i.e., CBCN1). The red chromatogram is for the blend of iPP and TAFMER™ P-0280 (an ethylene/alpha-olefin copolymer product available from Mitsui Chemicals). The blue chromatogram is for the blend of VERSIFY™ 2400 (a propylene-ethylene copolymer available from The Dow Chemical Company) and TAFMER™ P-0280. The dashed line is a linear regression fit of the chemical compositions of iPP, VERSIFY™ 2400, and TAFMER™ P-0280 versus their peak elution volumes. Note that VERSIFY™ 2400 has two peaks. The composition and elution volume of the main peak is used for the linear fit. The three polymers all have $M_w$ above 80,000 Daltons.

Transmission Electron Microscopy (TEM) is for morphology determination. A regions along mid-plane of the injection molded plaques were isolated and trimmed for comparison. The blocks were trimmed so that sections could be collected at the core and cut parallel with the machine direction. The trimmed samples were cryopolished prior to staining by removing sections from the blocks at −60° C. to prevent smearing of the elastomer phases. The cryo-polished blocks were stained with the vapor phase of a 2% aqueous ruthenium tetraoxide solution for 3 hrs at ambient temperature. The staining solution was prepared by weighing 0.2 gm of ruthenium (III) chloride hydrate ($RuCl_3 \times H_2O$) into a glass bottle with a screw lid and adding 10 ml of 5.25% aqueous sodium hypochlorite to the jar. The samples were placed in the glass jar using a glass slide having double sided tape. The slide was placed in the bottle in order to suspend the blocks about 1 inch above the staining solution. Sections of approximately 90 nanometers in thickness were collected at ambient temperature using a diamond knife on a Leica EM UC7 microtome and placed on 400 mesh virgin TEM grids for observation.

Image Collection—Images were collected on a JEOL JEM-1230 operated at 100 kV accelerating voltage and collected on a Gatan-791 and 794 digital cameras.

Xylene Soluble Fractionation Analysis: is performed by using a weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

$^{13}$C Nuclear Magnetic Resonance (NMR) involves the following:

Sample Preparation: The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Comonomer content in composite polymers may be measured using any suitable technique, with techniques based on nuclear magnetic resonance (NMR) spectroscopy preferred.

Gel Permeation Chromatography (GPC): The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polypropylene}=0.645(M_{polystyrene})$.

Polypropylene equivalent molecular weight calculations are performed using Viscotek TriSEC software Version 3.0.

CER Comonomer distribution analysis is performed with Crystallization Elution Fractionation (CEF) (PolymerChar, Spain) (Monrabal et al, Macromol. Symp. 257, 71-79 (2007)) equipped with IR-4 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B1378-500G, batch number 0981(0686) from Sigma-Aldrich are obtained. ODCB is distilled before use. Silica gel 40 (particle size 0.2~0.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB. ODCB can be also dried by passing through a column or columns packed with silica gel. For the CEF instrument equipped with an autosampler with N2 purging capability, Silica gel 40 is packed into two 300×7.5 mm GPC size stainless steel columns and the Silica gel 40 columns are installed at the inlet of the pump of the CEF instrument to dry ODCB; and no BHT is added to the mobile phase. This "ODCB containing BHT and silica gel" or ODCB dried with silica gel 40 is now referred to as "ODCB." This ODBC is sparged with dried nitrogen (N2) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 µl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 µm±6% (MO-SCI Specialty Products) with ⅛ inch stainless tubing according to U.S. Pat. No. 8,372,931. The column outside diameter (OD) is ⅛ inch. The critical parameters needed to duplicate the method include the column internal diameter (ID), and column length (L). The choice of ID and L must be such that when packed with the 125 µm diameter glass beads, the liquid internal volume is 2.1 to 2.3 mL. If L is 152 cm, then ID must be 0.206 cm and the wall thickness must be 0.056 cm. Different values for L and ID can be used, as long as the glass bead diameter is 125 µm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Preparation of Block Composite and Crystalline Block Composite

Block Composite (BC) samples are produced using a catalyst fed simultaneously into two reactors.

Each of the BC samples includes (i) an ethylene-propylene polymer, (ii) an isotactic propylene polymer, and (iii) a block copolymer including an ethylene-propylene soft block that has a same composition as the ethylene-propylene polymer and an isotactic polypropylene hard block that has a same composition as the isotactic propylene polymer. With respect to the block copolymers, the ethylene-propylene soft block is produced in the first reactor and the isotactic propylene hard block is produced in the second reactor. The split between soft and hard block in the block copolymer of the BC is approximately 50/50.

The BC samples are prepared using two continuous stirred tank reactors (CSTR) connected in series and using a catalyst fed simultaneously into both reactors. The soft blocks are produced in the first reactor and the hard block are produced in the second reactor. Each reactor is hydraulically full and set to operate at steady state conditions. In particular, the BCs prepared by flowing monomers, Catalyst, Cocatalyst-1, Cocatalyst-2, and SA (as a chain shuttling agent) according to the process conditions outlined in Table 1, below. Two port injectors are used to feed the Catalyst, Cocatalyst-1, Cocatalyst-2, and SA (shuttling agent)-1, separately into the reactors. For preparation of the BC and SBC, the Catalyst is ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium). The Cocatalyst-1 is a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.) are used. The Cocatalyst-2 is mixed $C_{14-18}$ alkyldimethylammonium salt of bis(tris(pentafluorophenyl)-alumane)-2-undecylimidazolide, prepared according to U.S. Pat. No. 6,395,671, Ex. 16. The SA is a solution of diethylzinc (DEZ) that may contain 1-3 mol % of modified methylalumoxane (MMAO-3A) from Akzo Nobel Chemicals. Upon exiting the reactor, water and/or additives may be injected into the polymer solution.

The process conditions for producing the BC samples are as follows:

TABLE 1

| Material | BC Reactor | |
|---|---|---|
| | 1st Reactor | 2nd Reactor |
| Reactor Control Temp.(° C.) | 105 | 115 |
| Solvent Feed (lb/hr) | 335 | 564 |
| Propylene Feed (lb/hr) | 28.18 | 73.84 |
| Ethylene Feed (lb/hr) | 51.7 | 0 |
| Hydrogen Feed SCCM | 67.74 | 0 |
| Reactor Ethylene Conc. (g/L) | 4.14 | 1.96 |
| Reactor Propylene Conc. (g/L) | 1.97 | 2.69 |
| Catalyst Efficiency (gPoly/gM) * 1.0E6 | 2.68 | 0.23 |
| Catalyst Flow (lb/hr) | 0.29 | 3.26 |
| Catalyst Conc. (ppm) | 99.98 | 99.98 |
| Cocatalyst-1 Flow (lb/hr) | 0.27 | 3 |
| Cocatalyst-1 Conc. (ppm) | 1995 | 1995 |
| Cocatalyst-2 Flow (lb/hr) | 0.34 | 1.86 |
| Cocatatlyst-2 Conc. (ppm) | 995 | 494 |
| DEZ Flow (lb/hr) | 1.6 | 0 |
| DEZ Conc. (ppm) | 37503 | 0 |

The characteristics of the BC samples are shown below in Table 2.

TABLE 2

| | MFR (g/10 min at 230° C. and 2.16 kg) | Density (g/cm$^3$) | Mw Kg/mol | Mw/Mn | Total C$_2$ (wt %) NMR | Second Peak Tm (° C.) | Tc (° C.) | Tg (° C.)[1] | Melt Enthalpy (J/g) |
|---|---|---|---|---|---|---|---|---|---|
| Block Composite | 6.5 | 0.8788 | 131 | 3.0 | 34.3 | 137.2 | 95.6 | −51.8 | 51.8 |

The CBC sample is synthesized in dual reactors in series, using a similar method as described above with the BC and SBC samples. The CBC sample includes (i) an ethylene-propylene polymer, (ii) an isotactic polypropylene polymer, and (iii) a block copolymer including an ethylene-propylene block that has a same composition as the ethylene-propylene polymer and an isotactic polypropylene block that has a same composition as the isotactic polypropylene polymer. The split between the EP and iPP blocks in the block copolymer of the CBC is approximately 50/50. The measured properties of the CBC samples are provided below in Table 3.

TABLE 3

| Material | MFR (g/10 min at 230° C. and 2.16 kg) | Density (g/cc) | wt % PP from HTLC Separation | Mw Kg/mol | Mw/Mn | Total wt % C$_2$ (NMR) | Tm (° C.) Peak 1 (Peak 2) | Tc (° C.) | Melt Enthalpy (J/g) |
|---|---|---|---|---|---|---|---|---|---|
| CBC | 9.8 | 0.905 | 19.9 | 104 | 2.73 | 47.6 | 107.9 (130.0) | 87.8 | 95 |

Block Composite Index Calculations

The term Block Composite Index (BCI) is herein defined to equal the weight percentage of the block copolymer divided by 100% (i.e., weight fraction). The value of the BCI can range from 0 up to 1.0, where 1.0 would be equal to 100% of the block copolymer and zero would be for material such as a traditional blend or random copolymer. Said in another way, for an insoluble fraction, the BCI is 1.0, and for a soluble fraction, the BCI is assigned a value of zero. The following is a description for estimating the block composite index.

Estimation of Block Composite Index is based on showing that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \% } C_{2_{Insoluble}}) + w_{soluble}(\text{wt \% } C_{2_{soluble}}) \quad \text{Eq. 1}$$

$$\text{Wt \% } C_{2_{Overall}} = w_{iPPHard}(\text{wt \% } C_{2iPP}) + w_{EP\ soft}(\text{wt \% } C_{2_{EPsoft}}) \quad \text{Eq. 2}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$w_{iPPhard} = \frac{\text{wt \% } C_{2xyleneinsoluble} - \text{wt \% } C_{2_{EPsoft}}}{\text{wt \% } C_{2iPPhard} - \text{wt \% } C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

The corresponding BCI calculations for BC are provided in Table 4, below.

TABLE 4

| Line # | Variable | Source | BC |
|---|---|---|---|
| 1 | Overall wt % C2 Total | Measured | 35.5 |
| 2 | wt % C2 in PP block/polymer | Measured | 0.5 |
| 3 | wt % C2 in EP block/polymer | Measured | 65 |
| 4 | wt fraction iPP (in block or polymer) | Calc. | 0.457 |
| 5 | wt fraction EP (in block or polymer) | Calc. | 0.543 |
| 6 | Analysis of HTLC Separation | — | |
| 7 | wt fraction xylene soluble | Measured | 0.281* |
| 8 | wt fraction xylene insoluble | Measured | 0.719* |
| 9 | wt % C2 in xylene insoluble | Measured | 24.0** |
| 10 | wt fraction PP in insoluble | Calc. | 0.636 |
| 11 | wt fraction EP in insoluble fraction | 1-Line 10 | 0.364 |
| 12 | wt fraction Diblock in insoluble fraction | Line 11/Line 5 | 0.671 |
| 13 | Block Composite Index (BCI) | Calc | 0.482 |

*Estimated from CEF
**Estimated mass balance

Crystalline Block Composite Index

CBCI provides an estimate of the quantity of block copolymer within the crystalline block composites under the assumption that the ratio of CEB/EB to CAOB/AOB within the diblock is the same as the ratio of ethylene to alpha-olefin in the overall block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP/AOP) and polyethylene (in this example the CEP/EP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight % propylene present in each of the fractions that are separated by HTLC.

The corresponding calculations for CBC are provided in Table 5, below.

TABLE 5

| Line # | Variable | Source | CBCI CBC |
|---|---|---|---|
| 1 | Overall wt % C3 Total | Measured | 52.400 |
| 2 | wt % C3 in PP block/polymer | Measured | 99.000 |
| 3 | wt % C3 in PE block/polymer | Measured | 10.500 |
| 4 | wt fraction PP (in block or polymer) | Eq. 2 below | 0.500 |
| 5 | wt fraction PE (in block or polymer) Analysis of HTLC Separation | 1-Line 4 | 0.500 |
| 6 | wt fraction isolated PP | Measured | 0.199 |
| 7 | wt fraction PE fraction | Measured | 0.801 |
| 8 | wt % C3 in PE-fraction | Eq. 4 below | 40.823 |
| 9 | wt fraction PP-diblock in PE fraction | Eq. 6 below | 0.343 |
| 10 | wt fraction PE in PE fraction | 1-Line 10 | 0.657 |
| 11 | wt fraction Diblock in PE fraction | 10/Line 4 | 0.685 |
| 12 | Crystalline Block Composite Index (CBCI) | Eq. 7.1 below | 0.549 |

Referring to Table 5, above, the CBCI is measured by first determining a summation of the weight % propylene from each component in the polymer according to Equation 1, below, which results in the overall weight % propylene/C3 (of the whole polymer). This mass balance equation can be used to quantify the amount of the PP and PE present in the block copolymer. This mass balance equation can also be used to quantify the amount of PP and PE in a binary blend or extended to a ternary, or n-component blend. For the CBCs, the overall amount of PP or PE is contained within the blocks present in the block copolymer and the unbound PP and PE polymers.

$$\text{Wt \% } C3_{Overall} = w_{PP}(\text{wt \% } C3_{PP}) + w_{PE}(\text{wt \% } C3_{PE}) \qquad \text{Eq. 1}$$

where $w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block Note that the overall weight % of propylene (C3) is measured from C'3 NMR or some other composition measurement that represents the total amount of C3 present in the whole polymer. The weight % propylene in the PP block (wt % $C3_{PP}$) is set to 100 (if applicable) or if otherwise known from its DSC melting point, NMR measurement, or other composition estimate, that value can be put into its place. Similarly, the weight % propylene in the PE block (wt % $C3_{PE}$) is set to 100 (if applicable) or if otherwise known from its DSC melting point, NMR measurement, or other composition estimate, that value can be put into its place.

Calculating the Ratio of PP to PE in the crystalline block composite and/or the specified block composite: Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the crystalline block composite and the specified block composite, it is assumed that the ratio of the weight fraction of PP to PE also corresponds to the average block ratio between PP and PE present in this statistical block copolymer.

$$w_{PP} = \frac{\text{wt \% } C3_{Overall} - \text{wt \% } C3_{PE}}{\text{wt \% } C3_{PP} - \text{wt \% } C3_{PE}} \qquad \text{Eq. 2}$$

where $w_{PP}$=weight fraction of PP present in the whole polymer
wt % $C3_{PP}$=weight percent of propylene in PP component or block
wt % $C3_{PE}$=weight percent of propylene in PE component or block To estimate the amount of the block copolymer (diblock) in the Crystalline Block Composite and/or the Specified Block Composite, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP block present in the diblock copolymer. By substituting the overall weight % C3 of the whole polymer in the left hand side of Equation 3, and the weight fraction of PP (isolated from HTLC) and the weight fraction of PE (separated by HTLC) into the right hand side of Equation 3, the weight % of C3 in the PE fraction can be calculated using Equations 4 and 5. The PE fraction is described as the fraction separated from the unbound PP and contains the diblock and unbound PE. The composition of the isolated PP is assumed to be the same as the weight % propylene in the PP block as described previously.

$$\text{wt \% } C3_{Overall} = \qquad \text{Eq. 3}$$
$$w_{PPisolated}(\text{wt \% } C3_{PP}) + w_{PE\text{-}fraction}(\text{wt \% } C3_{PE\text{-}fraction})$$

$$\text{wt \% } C3_{PE\text{-}fraction} = \frac{\text{wt \% } C3_{Overall} - w_{PPisolated}(\text{wt \% } C3_{PP})}{w_{PE\text{-}fraction}} \qquad \text{Eq. 4}$$

$$w_{PE\text{-}fraction} = 1 - w_{PPisolated} \qquad \text{Eq. 5}$$

where $w_{PPisolated}$=weight fraction of isolated PP from HTLC
$w_{PE\text{-}fraction}$=weight fraction of PE separated from HTLC, containing the diblock and unbound PE
wt % $C3_{PP}$=weight % of propylene in the PP; which is also the same amount of propylene present in the PP block and in the unbound PP
wt % $C3_{PE\text{-}fraction}$=weight % of propylene in the PE-fraction that was separated by HTLC
wt % $C3_{overall}$=overall weight % propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{\text{wt \% } C3_{PE\text{-}fraction} - \text{wt \% } C3_{PE}}{\text{wt \% } C3_{PP} - \text{wt \% } C3_{PE}} \qquad \text{Eq. 6}$$

Where wt % $C3_{PE\text{-}fraction}$=weight % of propylene in the PE-fraction that was separated by HTLC (Equation 4)
wt % $C3_{PP}$=weight % of propylene in the PP component or block (defined previously)
wt % $C3_{PE}$=weight % of propylene in the PE component or block (defined previously)
$w_{PP\text{-}diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7.1 or 7.2, respectively. To estimate the CBCI, the weight fraction of diblock in the PE fraction calculated using Equation 6 is divided by the overall weight fraction of PP (as calculated in Equation 2) and then multiplied by the weight fraction of the PE fraction. The value of the CBCI can range from 0 to 1.0, wherein 1.0 would be equal to 100% diblock and zero would be for a material such as a traditional blend or random copolymer.

$$CBCI = \frac{w_{PP\text{-}diblock}}{w_{PP}} \cdot w_{PE\text{-}fraction} \qquad \text{Eq. 7.1(CBCI)}$$

Where $w_{PP\text{-}diblock}$=weight fraction of PP in the diblock separated with the PE-fraction by HTLC (Equation 6)
$w_{PP}$=weight fraction of PP in the polymer
$w_{PE\text{-}fraction}$=weight fraction of PE separated from HTLC, containing the diblock and unbound PE (Equation 5)

Preparation of Working Examples and Comparative Examples

The materials principally used are the following:

| | |
|---|---|
| RCP | A clarified polypropylene random copolymer that is marketed as offering very good see-through and contact clarity, but is observed as having a relatively low toughness at lower temperatures, having a melt flow rate of 40 g/10 min (according to ASTM D1238 and at 230° C./2.16 kg), a density of 0.90 g/cc (according to ASTM D792), and a haze of 8% (available as Pro-fax RP448S from LyondellBasell). |
| OBC 1 | An ethylene-octene multi-block copolymer having a melt index of 15 grams/10 minutes (ASTM D1238 at 190° C./2.16 kg) and a density of 0.877 g/cc (ASTM D792) (available as INFUSE ™ 9817 from The Dow Chemical Company). |
| OBC 2 | An ethylene-octene multi-block copolymer having a melt index of 15 grams/10 minutes (ASTM D1238 at 190° C./2.16 kg) and a density of 0.866 g/cc (ASTM D792) (available as INFUSE ™ 9807 from The Dow Chemical Company). |
| OBC 3 | An ethylene-octene multi-block copolymer having a melt index of 5 grams/10 minutes (ASTM D1238 at 190° C./2.16 kg) and a density of 0.877 g/cc (ASTM D792) (available as INFUSE ™ 9500 from The Dow Chemical Company). |
| CBC | The Crystalline Block Composite discussed above that includes block copolymers having 50 wt % of EP soft blocks (with 90 wt % of ethylene, based on the total weight of the soft blocks) and 50 wt % of iPP hard blocks (with 1 wt % of ethylene, based on the total weight of the hard blocks), and a melt flow rate of 9.8 g/10 min at 230° C./2.16 kg. |
| BC | The Block Composite discussed above that includes block copolymers having 50 wt % of EP soft blocks (with 65 wt % of ethylene, based on the total weight of the soft blocks) and 50 wt % of iPP hard blocks (with 1 wt % of ethylene, based on the total weight of the hard blocks), and a melt flow rate of 6.5 g/10 min at 230° C./2.16 kg. |
| Polyolefin Copolymer | A high melt flow ethylene-octene polyolefin elastomer having a melt index of 500 g/10 min (according to ASTM D1238 and at 190° C./2.16 kg), a density of 0.874 g/cm$^3$ (according to ASTM D792), a Brookfield Viscosity at 177° C. of 17,000 cps, a DSC melting point of 70° C., and glass transition temperature of −56° C. (available as AFFINITY ™ GA 1950 from The Dow Chemical Company). |
| Copolymer 1 | A Block Composite that includes block copolymers having 70 wt % of EP soft blocks (with 65 wt % of ethylene, based on the total weight of the EP block) and 30 wt % of iPP hard blocks. |
| AO | An antioxidant available from BASF as Irganox ® B 225. |

Working Examples 1 to 12 and Comparative Examples A to D are prepared according to the formulations in Tables 6 and 7 seen below:

TABLE 6

| | Ex. A (wt %) | Ex. B (wt %) | Ex. C (wt %) | Ex. D (wt %) | Ex. 1 (wt %) | Ex. 2 (wt %) | Ex. 3 (wt %) | Ex. 4 (wt %) |
|---|---|---|---|---|---|---|---|---|
| RCP | 90.0 | 85.0 | 80.0 | 80.0 | 90.0 | 85.0 | 80.0 | 90.0 |
| OBC 1 | 10.0 | 15.0 | 20.0 | — | 8.5 | 12.8 | 17.0 | 9.3 |
| OBC 2 | — | — | — | — | — | — | — | — |
| OBC 3 | — | — | — | — | — | — | — | — |
| CBC | — | — | — | — | 1.5 | 2.3 | 3.0 | 0.8 |
| BC | — | — | — | — | — | — | — | — |
| Polyolefin Copolymer | — | — | — | — | — | — | — | — |
| Copolymer 1 | — | — | — | 20.00 | | | | |
| AO | 0.2 | 0.2 | 0.2 | 0.2 | 0.2 | 0.2 | 0.2 | 0.2 |

TABLE 7

| | Ex. 5 (wt %) | Ex. 6 (wt %) | Ex. 7 (wt %) | Ex. 8 (wt %) | Ex. 9 (wt %) | Ex. 10 (wt %) | Ex. 11 (wt %) | Ex. 12 (wt %) |
|---|---|---|---|---|---|---|---|---|
| RCP | 85.0 | 80.0 | 80.0 | 80.0 | 80.0 | 90.0 | 85.0 | 80.0 |
| OBC 1 | 13.9 | 18.5 | — | — | 5.0 | 8.5 | 12.8 | 17.0 |

TABLE 7-continued

|  | Ex. 5 (wt %) | Ex. 6 (wt %) | Ex. 7 (wt %) | Ex. 8 (wt %) | Ex. 9 (wt %) | Ex. 10 (wt %) | Ex. 11 (wt %) | Ex. 12 (wt %) |
|---|---|---|---|---|---|---|---|---|
| OBC 2 | — | — | 17.0 | — | — | — | — | — |
| OBC 3 | — | — | — | 17.0 | — | — | — | — |
| CBC | 1.1 | 1.5 | 3.0 | 3.0 | 6.0 | — | — | — |
| BC | — | — | — | — | — | 1.5 | 2.3 | 3.0 |
| Polyolefin Copolymer | — | — | — | — | 9.0 | — | — | — |
| AO | 0.2 | 0.2 | 0.2 | 0.2 | 0.2 | 0.2 | 0.2 | 0.2 |

In particular, the working examples and comparative examples are sample articles prepared by dry blending and injection molding on a KraussMaffei KM110-390 injection molding machine. Dual butterfly molds are used to make the samples (7.4 mm×7.4 mm squares) to which specimens used for Izod impact, Charpy Impact, and tensile testing were die cut into plaques of 1.6 mm and 0.75 mm thickness.

The properties of the sample articles of Working Examples 1 to 12 and Comparative Examples A to D, at a plaque specimen thickness of 1.60 mm, are evaluated as shown below in Tables 8 and 9.

TABLE 8

|  | Ex. A | Ex. B | Ex. C | Ex. D | Ex. 1 | Ex. 2 | Ex. 3 | Ex. 4 | Ex. 5 |
|---|---|---|---|---|---|---|---|---|---|
| Thickness (mm) | 1.6 | 1.6 | 1.6 | 1.6 | 1.6 | 1.6 | 1.6 | 1.6 | 1.6 |
| Tensile Secant Modulus at 2% (psi) | 1847 | 1658 | 1583 | 1479 | 1804 | 1646 | 1522 | 1820 | 1732 |
| Tensile Secant Modulus at 10% (psi) | 3842 | 3509 | 3341 | 3287 | 3804 | 3428 | 3165 | 3796 | 3653 |
| Tensile Stress @ break (psi) | 3031 | 3012 | 3085 | 3101 | 3075 | 3030 | 3093 | 3042 | 3186 |
| Average Strain at break (%) | 430 | 442 | 429 | 477 | 470 | 404 | 446 | 415 | 436 |
| % Clarity | 98 | 98 | 97 | 99 | 98 | 98 | 97 | 98 | 98 |
| % Haze | 24 | 33 | 36 | 30 | 26 | 31 | 34 | 23 | 28 |
| % Transmittance | 83 | 83 | 81 | 83 | 85 | 82 | 82 | 84 | 82 |
| 23° C. Avg. Charpy Impact (kJ/m$^2$) | 10 | 20 | 24 | 45 | 8 | 16 | 64 | 10 | 13 |
| 23° C. Avg. Izod Impact (kJ/m$^2$) | 8 | 20 | 25 | 25 | 6 | 25 | 24 | 7 | 7 |
| 0° C. Avg. Izod Impact (kJ/m$^2$) | 4 | 7 | 8 | 24 | 4 | 8 | 23 | 4 | 6 |
| −20° C. Avg. Izod Impact (kJ/m$^2$) | 3 | 7 | 6 | 8 | 3 | 5 | 9 | 4 | 4 |
| 23° C. Charpy Impact % Ductile Failure | 0 | 10 | 20 | 100 | 0 | 0 | 100 | 0 | 0 |
| 23° C. Izod Impact (% Ductile Failure) | 0 | 80 | 100 | 100 | 0 | 90 | 100 | 0 | 0 |

TABLE 8-continued

|  | Ex. A | Ex. B | Ex. C | Ex. D | Ex. 1 | Ex. 2 | Ex. 3 | Ex. 4 | Ex. 5 |
|---|---|---|---|---|---|---|---|---|---|
| 0° C. Izod Impact (% Ductile Failure) | 0 | 0 | 0 | 70 | 0 | 0 | 60 | 0 | 0 |
| −20° C. Izod Impact (% Ductile Failure) | 0 | 10 | 0 | 0 | 0 | 0 | 10 | 0 | 0 |

TABLE 9

|  | Ex. 6 | Ex. 7 | Ex. 8 | Ex. 9 | Ex. 10 | Ex. 11 | Ex. 12 |
|---|---|---|---|---|---|---|---|
| Thickness (mm) | 1.6 | 1.6 | 1.6 | 1.6 | 1.6 | 1.6 | 1.6 |
| Tensile Secant Modulus at 2% (psi) | 1547 | 1518 | 1518 | 1532 | 1802 | 1661 | 1577 |
| Tensile Secant Modulus at 10% (psi) | 3198 | 3154 | 3218 | 3225 | 3720 | 3527 | 3240 |
| Tensile Stress @ break (psi) | 3009 | 2789 | 3343 | 3319 | 3144 | 3022 | 3071 |
| Average Strain at break (%) | 419 | 396 | 480 | 470 | 416 | 401 | 452 |
| % Clarity | 98 | 97 | 96 | 99 | 98 | 97 | 97 |
| % Haze | 38 | 50 | 43 | 20 | 29 | 35 | 40 |
| % Transmittance | 82 | 76 | 82 | 84 | 82 | 81 | 80 |
| 23° C. Avg. Charpy Impact (kJ/m$^2$) | 52 | 64 | 27 | 59 | 11 | 16 | 66 |
| 23° C. Avg. Izod Impact (kJ/m$^2$) | 24 | 25 | 19 | 23 | 8 | 21 | 23 |
| 0° C. Avg. Izod Impact (kJ/m$^2$) | 26 | 24 | 8 | 18 | 5 | 10 | 28 |
| −20° C. Avg. Izod Impact (kJ/m$^2$) | 12 | 17 | 10 | 8 | 4 | 6 | 14 |
| 23° C. Charpy Impact (% Ductile Failure) | 100 | 100 | 35 | 90 | 0 | 0 | 100 |
| 23° C. Izod Impact (% Ductile Failure) | 100 | 100 | 70 | 100 | 0 | 70 | 100 |
| 0° C. Izod Impact (% Ductile Failure) | 80 | 80 | 0 | 50 | 0 | 10 | 90 |
| −20° C. Izod Impact (% Ductile Failure) | 20 | 30 | 10 | 10 | 0 | 0 | 20 |

The properties of Working Examples 1 to 12 and Comparative Examples A to D, at a specimen thickness of 0.75 mm, are evaluated as shown below in Tables 10 and 11. In this regard, it is noted that the specimen thickness of 0.75 mm is too thin for impact data. Accordingly, the properties tested for the 0.75 mm plaques are optical properties.

TABLE 10

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Thickness (mm) | 0.75 | 0.75 | 0.75 | 0.75 | 0.75 | 0.75 | 0.75 | 0.75 |
| % Clarity | 99 | 98 | 98 | 98 | 99 | 98 | 98 | 98 |
| % Haze | 10 | 13 | 16 | 12 | 11 | 16 | 24 | 20 |
| % Transmittance | 89 | 88 | 88 | 88 | 89 | 87 | 84 | 89 |

TABLE 11

|  | Ex. 9 | Ex. 10 | Ex. 11 | Ex. 12 | Ex. A | Ex. B | Ex. C | Ex. D |
|---|---|---|---|---|---|---|---|---|
| Thickness (mm) | 0.75 | 0.75 | 0.75 | 0.75 | 0.75 | 0.75 | 0.75 | 0.75 |
| % Clarity | 99 | — | — | — | 98 | 99 | 98 | 99 |
| % Haze | 9 | — | — | — | 11 | 14 | 17 | 13 |
| % Transmittance | 90 | — | — | — | 89 | 88 | 87 | 89 |

With regard to the examples, "modifier" is defined as the combination of the OBC and BC/CBC for each particular example. Accordingly, a modifier loading for an example would be the combined weight percentages of the OBC and BC/CBC relative to the total weight percent of the formulation. With regard to the modifier itself, weight percentages of the OBC and BC/CBC may also be given based on the total weight percent of the modifier.

Comparative Examples A to C show the effect of increasing OBC 1 from 10 to 20% in a blend with the RCP. With increasing amount of OBC 1, a corresponding decrease in the tensile modulus and increase in % haze occurs. With increasing amount of OBC 1, impact energies by Charpy and IZOD measurements increase. At 23° C., Example B and C exhibit some ductile; Example B, 10% ductile for Charpy impact and 80% ductile for IZOD impact, Example C, 20% ductile for Charpy impact and 100% ductile for IZOD impact. At cold temperatures, with increasing amount of OBC 1, impact energies by IZOD measurements increase slightly and specimens exhibit brittle failure. Comparative Example D exhibit higher impact energies at 23° C. and subambient temperatures with 70% ductile failure Izod impact is observed at 0° C.

Additionally, at a 20% loading of the modifier, a lower haze % of 30 is observed than Example C, 36% haze. Working examples 1 through 3 show the effect of incorporating the CBC with OBC 1 at a 15% amount of CBC relative to the total amount of modifier added. With increasing amount of OBC 1 and CBC, a corresponding decrease in the tensile modulus and increase in % haze occurs; but surprisingly, the % haze at the 15 and 20% loading is lower than the comparative examples B and C. With increasing amount of OBC 1 and CBC, impact energies by Charpy and IZOD measurements increase and for Example 6, at 20% loading of modifier, specimens exhibit ductile failure at 23° C.; however, remarkably Example 3 exhibits significantly higher Charpy impact energy (64 kJ/m² by Charpy testing). At cold temperatures, with increasing amount of OBC 1 and CBC, the impact energies by IZOD measurements increase but at 0° C., an IZOD impact energy of 23 kJ/m² and 60% ductile failure is observed and at −20° C., an IZOD impact energy of 10 kJ/m² and 10% ductile failure is observed.

Working examples 4 through 6 show the effect of incorporating the CBC with OBC 1 at a 7.5% amount of CBC relative to the total amount of modifier added. With increasing amount of OBC 1 and CBC, a minimal change in the tensile modulus occurs. With increasing amount of OBC 1 and CBC, an increase in the haze % occurs. With increasing amount of OBC 1 and CBC, impact energies by Charpy and IZOD measurements, only Example 6 at a 20% loading of the modifier showed a dramatic increase in impact energies and exhibited 100% ductile failure at 23° C. and 52 kJ/m² (Charpy impact) and 24 kJ/m² (Izod impact). At cold temperatures, with increasing amount of OBC 1 and CBC, the impact energies by IZOD measurements, only Example 6 at a 20% loading of the modifier showed a dramatic increase and exhibited a IZOD impact energy of 26 kJ/m² at 0° C. and 12 kJ/m² at −20° C., with 100% and 80% ductile failure, respectively, is observed.

Working Examples 3, 7, and 8 compare the effects of OBC 1, OBC 2, and OBC 3 when combined with the CBC on the tensile, optics, and impact properties. With changing OBC, the tensile properties remained similar however, % haze increases in the order of OBC 1 (34%), OBC 3 (43%), OBC 2 (50%). With changing OBC when combined with the CBC, the impact energies by Charpy measurements; OBC 1 exhibited high impact energy (64 kJ/m²), OBC 2 (64 kJ/m²), and followed by OBC 3 (27 kJ/m²). With changing OBC when combined with the CBC, the impact energies by IZOD measurements; at 23 and 0° C., OBC 3 exhibits lower impact energies than OBC 1 and OBC 2 which show similar impact energies. However, at −20° C., OBC 2 exhibits significantly higher impact energy, 17 kJ/m² (OBC 2) versus 9 kJ/m² (OBC 1). In terms of % ductile failure, OBC 2 exhibits a much higher % of ductile failure than OBC 1; OBC 3 shows lower % ductile failure.

Working Example 9 shows the results of OBC 1 and CBC when additionally combined with the Polyolefin copolymer on the tensile properties, optics, and impact properties. Relative to the other working examples at a 20% loading of modifier, Example 9 exhibited similar tensile properties, good Charpy and IZOD impact properties at both 23° C. and 0° C., and 90% or more ductile failure. Surprisingly, Example 9, exhibits a low haze % of 20, the lowest amongst all of the examples.

Working examples 10 through 12 show the effect of incorporating the BC with OBC 1 at a 15% amount of OBC relative to the total amount of modifier added. With increasing amount of OBC 1 and BC, a corresponding decrease in the tensile modulus and increase % haze occurs. With increasing amount of OBC 1 and BC, impact energies by Charpy and IZOD measurements increase and example 12, at 20% modifier loading, the specimens exhibit ductile failure at 23° C. At cold temperatures, with increasing amount of OBC 1 and BC, the impact energies by IZOD measurements increase but at 0° C., an IZOD impact energy of 28 kJ/m$^2$, along with 90% ductile failure and at −20° C., an IZOD impact energy of 14 kJ/m$^2$ is observed along with 20% ductile failure.

Figure 2:
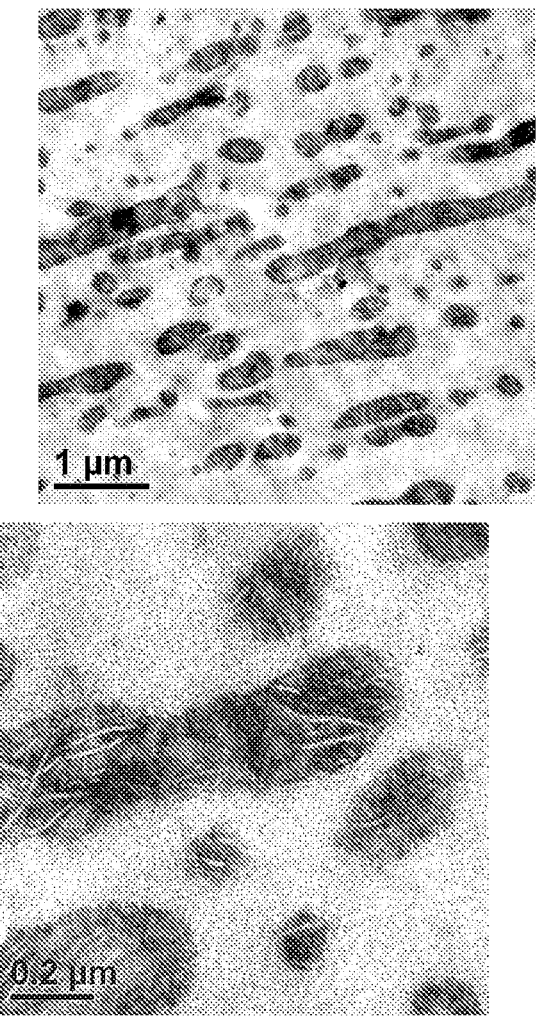
FIG. 2 illustrates the TEM morphology of Working Ex. 3 at 1 μm and 0.2 μm.
Figure 3:
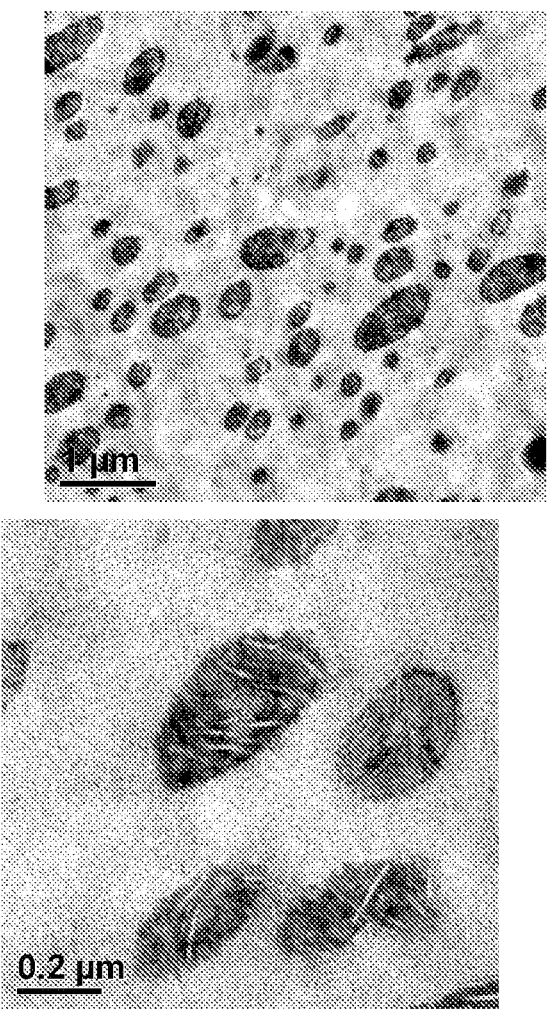
FIG. 3 illustrates the TEM morphology of Working Ex. 2 at 1 μm and 0.2 μm.
Figure 4:
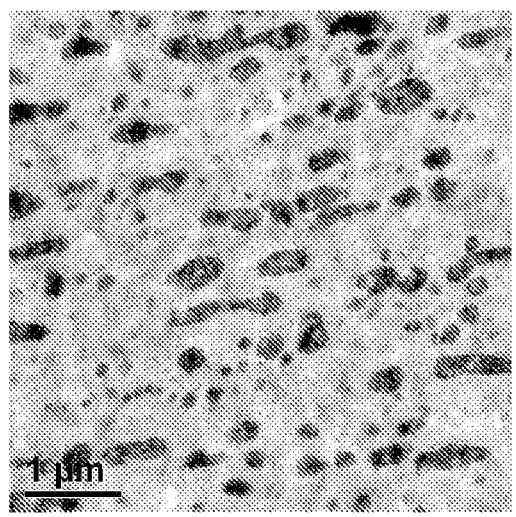
FIG. 4 illustrates the TEM morphology of Working Ex. 9 at 1 μm and 0.2 μm.
Figure 4:
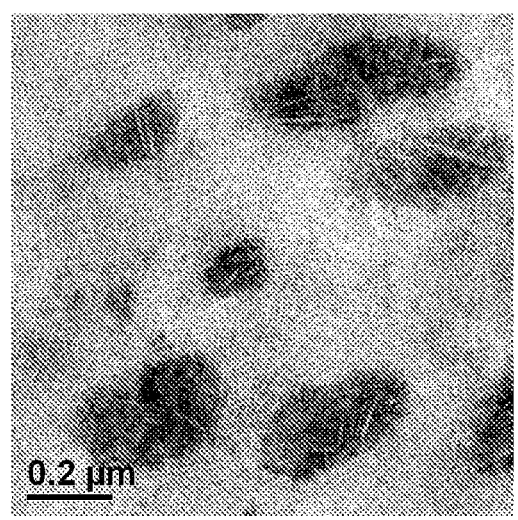
Figure 5:
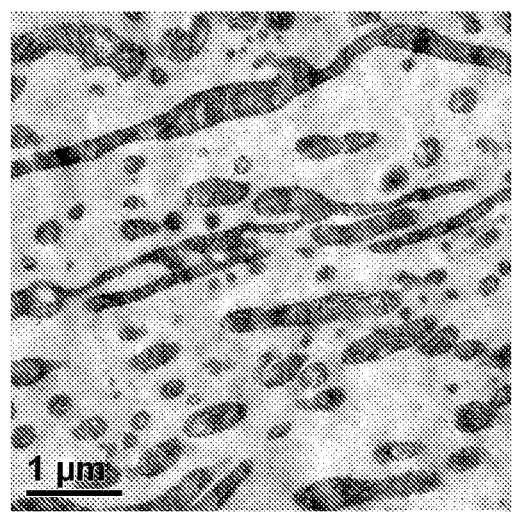
FIG. 5 illustrates the TEM morphology of Working Ex. 6 at 1 μm and 0.2 μm.
Figure 5:
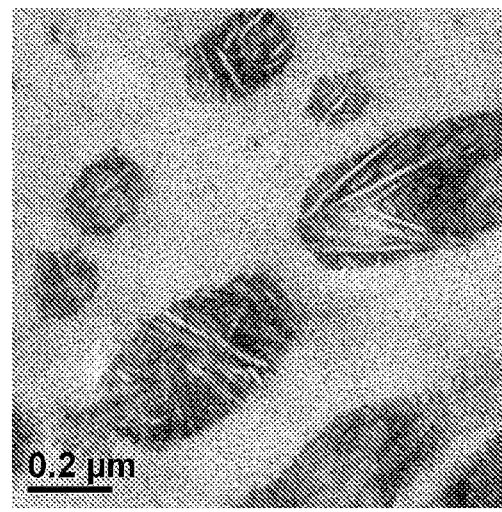

FIGS. 1 to 6 compares the TEM morphology of Comparative Example C and Example 3, 2, 9, 6, and 5; depicting the changes in the dispersion of the modifier within the RCP from the injection molding specimens (specimens cut and analyzed in the parallel direction to the injection flow). FIG. 1 shows Comparative Example C with OBC 1 at a 20% modifier loading results in an elongated, flow aligned structure with a domain size about 300 nm in the shortest dimension. FIG. 2 shows Working Example 3 with OBC 1 and CBC at a 20% modifier loading results in an elongated, flow aligned structure with a domain size about 200 nm in the shortest dimension. FIG. 3 shows Working Example 2 with OBC 1 and CBC at a 15 modifier loading results in well-dispersed, round and individual domain sizes that are about 150 to 200 nm in the shortest dimension. FIG. 4 shows Working Example 9 with OBC 1, CBC, and Polyolefin copolymer at a 20% modifier loading results in well-dispersed, round and individual domain sizes that are 100 to 200 nm in the shortest dimension. FIG. 5 shows Working Example 6 with OBC 1 and CBC at a 20% modifier loading results in a mix of elongated, flow aligned structures and individual domains that are 100-250 nm in the shortest dimension.

Figure 6:
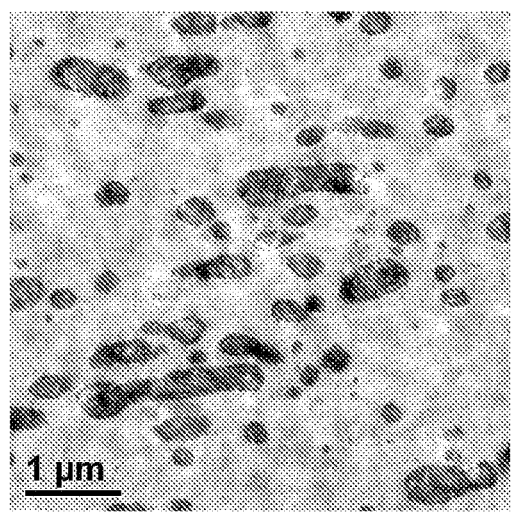
FIG. 6 illustrates the TEM morphology of Working Ex. 5 at 1 μm and 0.2 μm.
Figure 6:
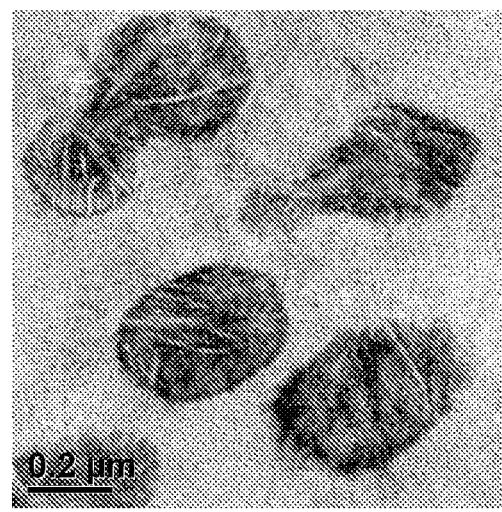

FIG. 6 shows Working Example 5 with OBC 1 and CBC at a 15% modifier loading results in mostly individual domains that are 250-300 nm in the shortest dimension.

The invention claimed is:

1. A composition for forming a sub-ambient temperature use container, the composition comprising:
   (a) from 60 wt % to 90 wt % of a propylene polymer base that has a melt flow rate from 2 g/10 min to 100 g/10 min according to ASTM D1238 (230° C./2.16 kg);
   (b) from 2 wt % to 39.5 wt % of an olefin block copolymer;
   (c) from 0.5 wt % to 20 wt % of a composite component comprising a crystalline block composite or a block composite; and
   (d) from 1 wt % to 30 wt % a polyolefin copolymer, the polyolefin copolymer being derived from ethylene and a $C_3$ to $C_{10}$ alpha-olefin, having a melt index from 100 g/10 min to 2000 g/10 min according to ASTM D1238 (190° C./2.16 kg), and having a density from 0.860 g/cc to 0.900 g/cc.

2. The composition of claim 1, further comprising: (e) from 0.1 wt % to 5 wt % of an antioxidant.

3. The composition of claim 1, wherein the propylene polymer base includes a random copolymer polypropylene that has an ethylene content from 0.5 wt % to 5.0 wt %, based on the total weight of the random copolymer polypropylene.

4. The composition of claim 1, wherein the composite component comprises a crystalline block composite, and wherein the crystalline block composite has a melt flow rate from 2 g/10 min to 10 g/10 min, according to ASTM D 1238 and at 230° C./2.16 kg, and a density from 0.890 g/cc to 0.910 g/cc according to ASTM D792.

5. The composition of claim 1, wherein the composite component comprises a block composite, and wherein the block composite has a melt flow rate from 2 g/10 min to 10 g/10 min, according to ASTM D 1238 and at 230° C./2.16 kg, and density from 0.870 g/cc to 0.890 g/cc according to ASTM D792.

6. An article made from the composition of claim 1, wherein the article has greater than 95% clarity and an Izod impact greater than or equal to 5 kJ/m$^2$ at −20° C., according to ASTM D256, at a thickness of less than 3.0 mm.

7. A freezer container formed from the composition of claim 1, wherein the container has greater than 95% clarity and an Izod impact greater than or equal to 5 kJ/m$^2$ at −20° C., according to ASTM D256, at a thickness of less than 3.0 mm.

* * * * *